(12) United States Patent
Lee et al.

(10) Patent No.: US 10,127,889 B2
(45) Date of Patent: Nov. 13, 2018

(54) DISPLAY SYSTEM FOR ENHANCING VISIBILITY AND METHODS THEREOF

(71) Applicant: SAMSUNG ELECTRONICS CO., LTD., Suwon-si (KR)

(72) Inventors: Seung-heon Lee, Suwon-si (KR); Se-hoon Kim, Suwon-si (KR); Won-hee Choe, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 102 days.

(21) Appl. No.: 14/919,837

(22) Filed: Oct. 22, 2015

(65) Prior Publication Data
US 2016/0358582 A1 Dec. 8, 2016

(30) Foreign Application Priority Data

Jun. 3, 2015 (KR) .......................... 10-2015-0078375

(51) Int. Cl.
G09G 5/10 (2006.01)
G06F 3/147 (2006.01)
G09G 3/34 (2006.01)
G06F 3/14 (2006.01)

(52) U.S. Cl.
CPC ............ *G09G 5/10* (2013.01); *G06F 3/1446* (2013.01); *G09G 2300/026* (2013.01); *G09G 2320/0233* (2013.01); *G09G 2320/0686* (2013.01); *G09G 2360/144* (2013.01)

(58) Field of Classification Search
CPC ............ G06F 3/1446; G09G 2300/026; G09G 2320/0233; G09G 2320/0686; G09G 2360/144; G09G 5/10
See application file for complete search history.

(56) References Cited

U.S. PATENT DOCUMENTS

| 8,319,804 B2 | 11/2012 | Kuo | |
|---|---|---|---|
| 8,605,107 B2 | 12/2013 | Choi et al. | |
| 2008/0218501 A1* | 9/2008 | Diamond | G09G 3/22 345/207 |
| 2009/0115751 A1* | 5/2009 | Gover | G06F 3/1446 345/204 |
| 2011/0134252 A1* | 6/2011 | Furukawa | H04N 5/44504 348/177 |
| 2011/0242142 A1 | 10/2011 | Hussain et al. | |

(Continued)

FOREIGN PATENT DOCUMENTS

| DE | 19845092 A1 | 4/2000 |
|---|---|---|
| JP | 2004-294921 A | 10/2004 |

(Continued)

OTHER PUBLICATIONS

English Translation of JP 2008-233379.*

(Continued)

*Primary Examiner* — Hong Zhou
(74) *Attorney, Agent, or Firm* — Sughrue Mion, PLLC

(57) ABSTRACT

Provided is a display system. The display system includes: a display; a sensor that senses light that is irradiated onto the surface of the display; and a controller that locally adjusts the luminance of a partial area in which visibility deteriorates as a result of the irradiated light in all display areas of the display.

18 Claims, 23 Drawing Sheets

(56) References Cited

U.S. PATENT DOCUMENTS

| | | | |
|---|---|---|---|
| 2012/0044224 A1* | 2/2012 | Michisaka | G09G 3/3426 345/207 |
| 2012/0212467 A1* | 8/2012 | Kohtoku | G02F 1/1354 345/207 |
| 2012/0268437 A1* | 10/2012 | Lee | G09G 3/20 345/207 |
| 2013/0027370 A1* | 1/2013 | Dunn | G06F 3/14 345/207 |
| 2013/0033467 A1* | 2/2013 | Kohtoku | G02F 1/133603 345/204 |
| 2013/0321369 A1* | 12/2013 | Mirski-Fitton | G09G 3/3208 345/207 |
| 2014/0092119 A1 | 4/2014 | Jung et al. | |
| 2014/0160099 A1 | 6/2014 | Li et al. | |
| 2015/0091792 A1 | 4/2015 | Koo | |
| 2017/0045936 A1* | 2/2017 | Kakapuri | G06F 3/011 |

FOREIGN PATENT DOCUMENTS

| | | | |
|---|---|---|---|
| JP | 2008233379 A | * | 10/2008 |
| KR | 10-2011-0005015 A | | 1/2011 |
| KR | 20110087413 A | * | 8/2011 |
| KR | 10-2012-0042004 A | | 5/2012 |
| KR | 10-2014-0042578 A | | 4/2014 |
| WO | 2011100150 A1 | | 8/2011 |

OTHER PUBLICATIONS

English Translation of KR 20110087413.*
International Search Report dated Aug. 29, 2016 issued by International Searching Authority in counterpart International Application No. PCT/KR2016/005426 (PCT/ISA/210).
Written Opinion dated Aug. 29, 2016 issued by International Searching Authority in counterpart International Application No. PCT/KR2016/005426 (PCT/ISA/237).

* cited by examiner

FIG. 12
(a)
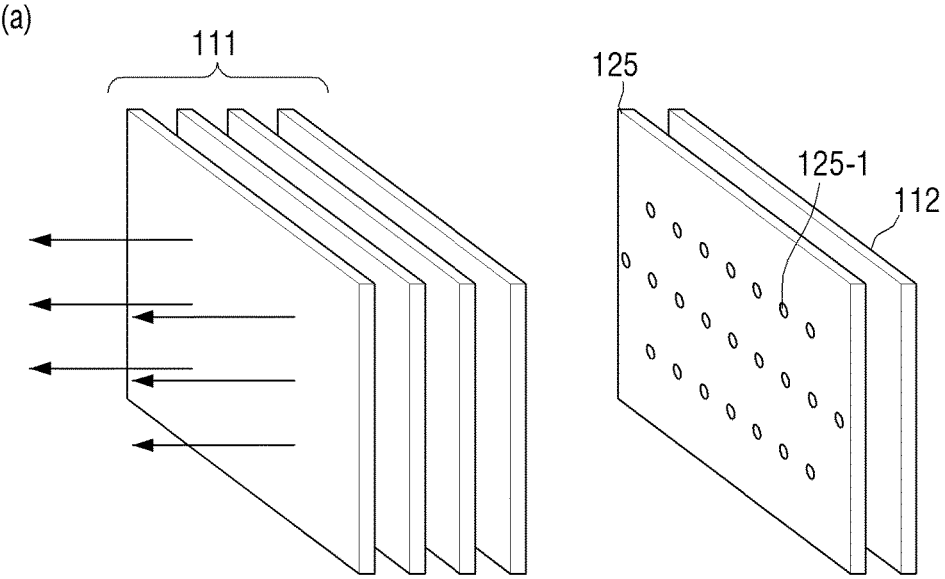
(b)
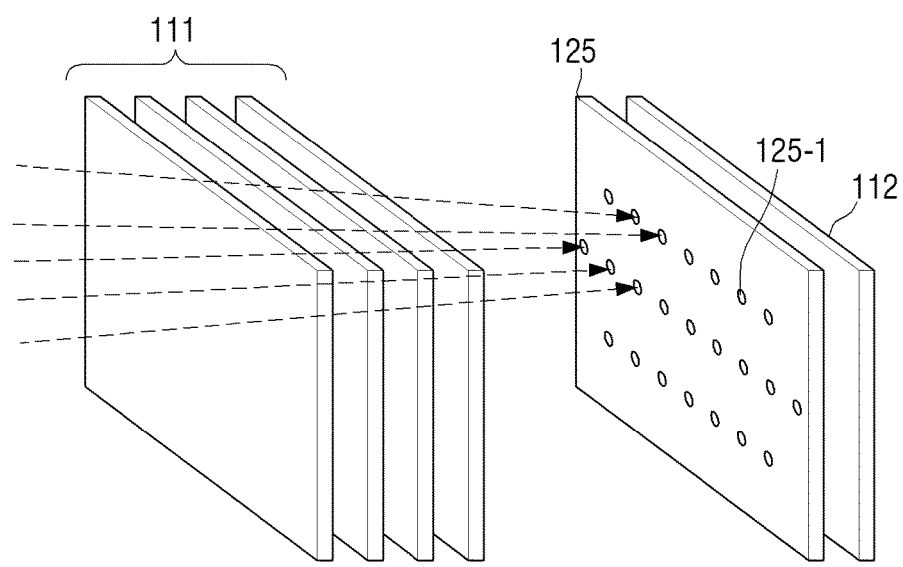

FIG. 19
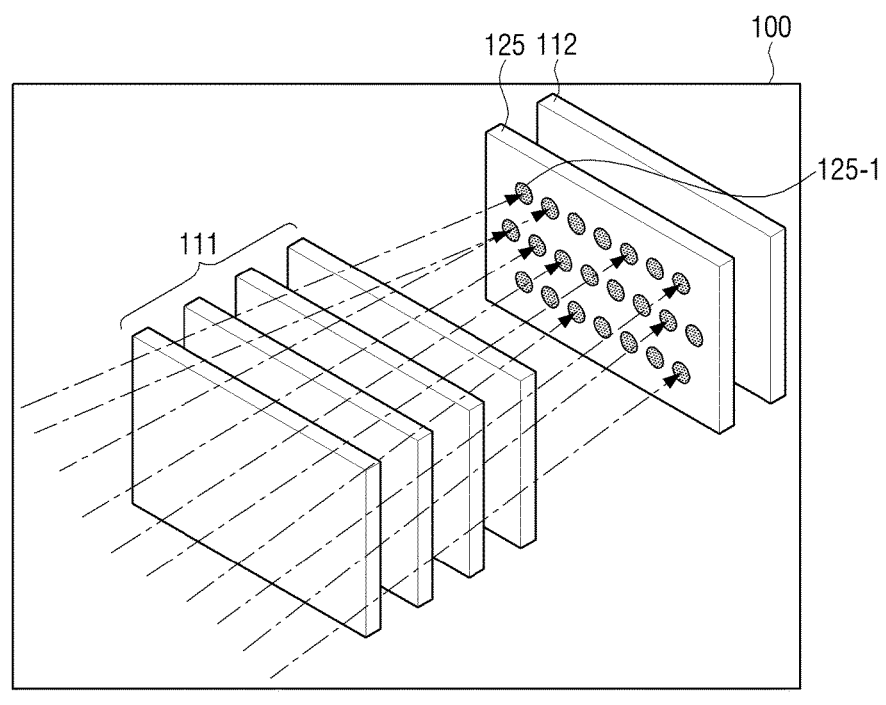
⬇ DETERMINING COLOR COMPONENT OF LIGHT
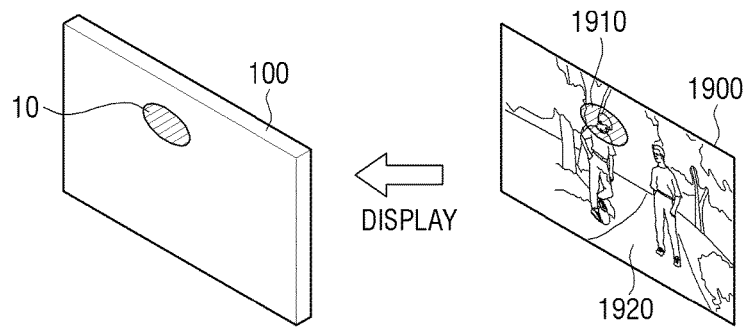
⬅ DISPLAY

DISPLAY SYSTEM FOR ENHANCING VISIBILITY AND METHODS THEREOF

CROSS-REFERENCE TO RELATED APPLICATION(S)

This application claims priority from Korean Patent Application No. 10-2015-0078375, filed on Jun. 3, 2015 in the Korean Intellectual Property Office, the disclosure of which is incorporated herein by reference in its entirety.

BACKGROUND

Field

Apparatuses and methods consistent with one or more exemplary embodiments relate to a display system for enhancing visibility and methods thereof, and more particularly, to a display system for enhancing visibility which deteriorates due to external light irradiated onto the surface of a display and methods thereof.

Description of the Related Art

With the development of electronic technology, various types of display systems have been used. Examples of the display systems may include a television (TV), a monitor, an electronic display board, an electronic picture frame, a kiosk, a cellular phone, a beam projector, and the like.

As the types of the display systems are diversified, the sizes or utilization methods thereof are also diversified. As one example, many outside display systems have been used, which are installed in outside places where various events, including an public performance or assembly, cheering, an election campaign, and the like occur, or various places including a subway station, public square, and the like through which people pass. The display systems may be fixed display systems that are fixedly disposed outdoors or mobile display systems which can be installed in a moving body, such as a vehicle, and moved to various places.

Most of the display systems used outdoors can be operated in the daytime. In this case, when light directly irradiated from the sun or light reflected by a surrounding reflector is irradiated to a display screen, visibility of the displayed contents may deteriorate. The visibility of even display systems that are used not only outdoors, but indoors as well, may deteriorate due to sunlight that is incident through a window, and the like, a strong indoor illumination, a flash light, and the like.

In particular, most display systems which have been recently used have relatively large display sizes. The display systems are also referred to as a so called large format display (LFD) system. The LFD system can be used as an advertising board, a digital signage, or a digital information display (DID).

As the display size increases, light is irradiated only to a partial area of the display screen of the display system, and as a result, the visibility may deteriorate in a local area.

Accordingly, the need of a display system that is capable of enhancing visibility in order to overcome the deterioration of the visibility and methods thereof comes to the fore.

SUMMARY

Exemplary embodiments overcome the above disadvantages and other disadvantages not described above. Also, the present inventive concept is not required to overcome the disadvantages described above, and an exemplary embodiment may not overcome any of the problems described above.

Exemplary embodiments provide a display system for enhancing visibility and methods thereof.

According to an aspect of one or more exemplary embodiments, a display system includes: a display device configured to display at least one content; a sensor configured to sense light that is irradiated onto the surface of the display device; and a controller configured to locally adjust the luminance of at least one portion of the display device at which the sensed light causes a deterioration in a visibility of the displayed at least one content.

The display device may include a plurality of displays that are combined with each other in order to display a single content, and the controller may be further configured to increase the luminance of at least one portion of the plurality of displays to which the sensed light is irradiated.

The sensor may include a plurality of illuminance sensors that are distributed in at least one from among a plurality of connectors and a plurality of bezel areas that are included in the plurality of displays.

When illuminance values of light sensed by the plurality of illuminance sensors are nonuniform, the controller may be further configured to generate a light intensity map by interpolating the illuminance values and to use the light intensity map for the adjusting the luminance.

The controller may be further configured to determine a first area in which the illuminance of the sensed light is greater than a first threshold as an invisible area, to determine a second area in which the illuminance of the sensed light is greater than a second threshold and equal to or less than the first threshold as a visibility deterioration area, and to determine a third area in which the illuminance of the sensed light is less than the second threshold as a normal area in order to perform different respective processing functions with respect to each of the first area, the second area, and the third area.

The display device may include a plurality of displays that are combined with each other in order to display a single content, and when at least one invisible area exists in the display device, the controller may be further configured to modify at least one from among the layout and a scale of the single content so that the single content is not displayed in the at least one invisible area.

The display device may include a plurality of displays that are combined with each other in order to display a single content, and when at least one invisible area exists in the display device, the controller may be further configured to modify the layout of the single content so that a primary object from among a plurality of objects included in the single content and displayed in the at least one invisible area is moved to an area that is outside of the at least one invisible area to be displayed.

The display device may include a display panel, and the sensor may include a light quantity sensing layer disposed in a rear direction of the display panel.

The controller may be further configured to correct a content color of an area of the display device in which the sensed light is incident in order to offset a color change influence by the incident light.

The display device may include a single display panel configured to display a single content, and when the visibility of the displayed single content deteriorates, the controller may be further configured to locally increase the luminance of the at least one portion of the display device.

According to another aspect of one or more exemplary embodiments, a method for enhancing visibility in a display system includes: displaying a plurality of contents by using a display device that includes a plurality of displays that are combined with each other in order to display the plurality of contents as a single content; sensing light that is irradiated onto the surface of the display device; and locally adjusting the luminance of at least one portion of the display device at which the sensed light causes a deterioration in a visibility of the displayed single content.

The sensing the light may include sensing the illuminance of the irradiated light by using a plurality of illuminance sensors that are distributed in at least one from among a plurality of connectors and a plurality of bezel areas that are included in the plurality of displays.

The locally adjusting the luminance may include generating, when illuminance values of light sensed by the plurality of illuminance sensors are nonuniform, a light intensity map by interpolating the illuminance values, determining the at least one portion of the display device at which the visibility deteriorates by using the light intensity map, and increasing the luminance of the determined at least one portion of the display device.

The method may further include: determining a first area in which the illuminance of the sensed light is greater than a first threshold as an invisible area, determining a second area in which the illuminance of the sensed light is greater than a second threshold and equal to or less than the first threshold as a visibility deterioration area, and determining a third area in which the illuminance of the sensed light is less than the second threshold as a normal area.

The method may further include: modifying, when at least one invisible area exists in the display device, at least one from among the layout and a scale of the plurality of contents so that the plurality of contents are not displayed in the at least one invisible area.

The method may further include: moving, when at least one invisible area exists in the display device, a primary object from among a plurality of objects included in the plurality of contents and displayed in the at least one invisible area to an area that is outside of the at least one invisible area, and displaying the primary object in the outside area.

The step of sensing the light may include sensing the illuminance of the light by using a respective light quantity sensing layer disposed in a rear direction of a corresponding display panel included in each of the plurality of displays.

The method may further include: sensing a color characteristic of the sensed irradiated light by using a respective light quantity sensing layer disposed in a rear direction of a corresponding display panel included in each of the plurality of displays; and correcting a contents color of an area of the display device in which the sensed irradiated light is incident based on the sensed color characteristic in order to offset a color change influence by the incident light.

According to yet another aspect of one or more exemplary embodiments, there is provided a non-transitory recording medium configured to store a program for performing a method for enhancing visibility in a display system that includes a plurality of displays that are combined with each other in order to display a single content, wherein the method includes: sensing light that is irradiated onto the display system; and locally adjusting the luminance of at least one portion of the display system at which the sensed light causes a deterioration in a visibility of the displayed single content.

The method may further include adjusting, when an invisible area exists in the display system, at least one from among the layout and a scale of the single content.

Additional and/or other aspects and advantages will be set forth in part in the description which follows and, in part, will be apparent from the description, or may be learned by practice of the exemplary embodiments.

BRIEF DESCRIPTION OF THE DRAWINGS

The above and/or other aspects will be more apparent by describing certain exemplary embodiments with reference to the accompanying drawings, in which:

FIG. 12 is a diagram for describing a configuration of a sensing unit embedded in the display;

FIG. 19 is a diagram illustrating an operation of the display system, according to yet another exemplary embodiment;

DETAILED DESCRIPTION

Figure 1:
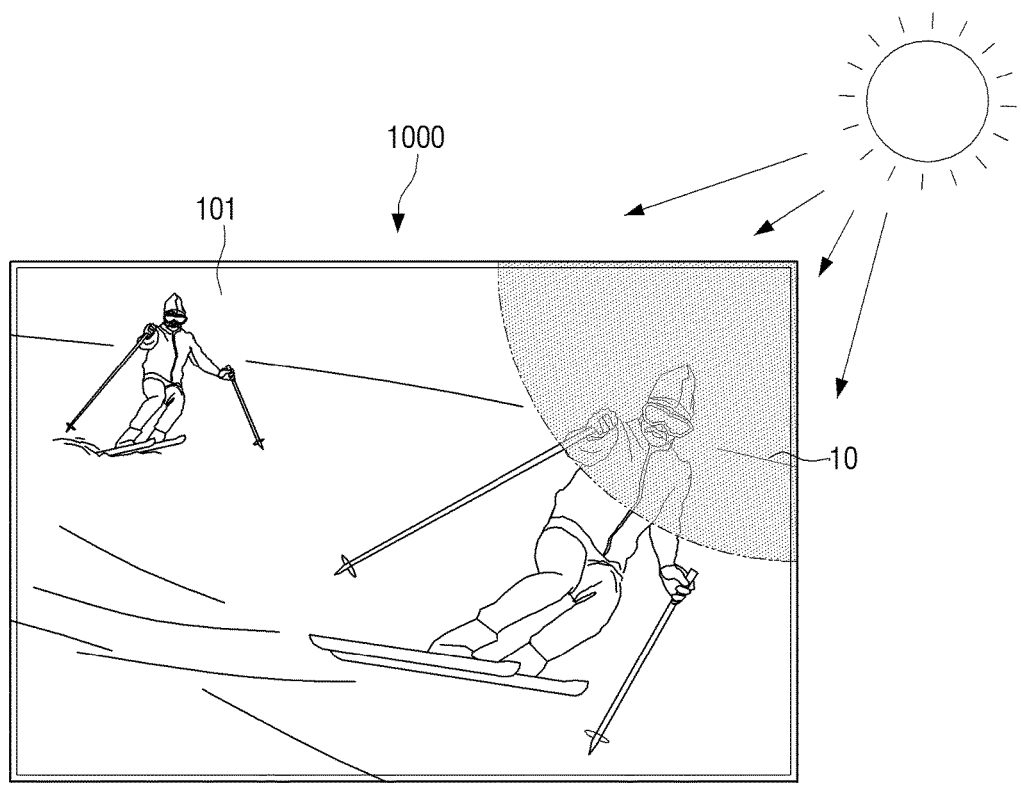
FIG. 1 is a diagram for describing an operation of a display system, according to an exemplary embodiment.

Certain exemplary embodiments will now be described in greater detail with reference to the accompanying drawings.

In the following description, same drawing reference numerals are used for the same elements, even in different drawings. The matters defined in the description, such as detailed construction and elements, are provided to assist in a comprehensive understanding of the present inventive concept. Thus, it is apparent that the exemplary embodiments can be carried out without those specifically defined matters. In addition, well-known functions or constructions are not described in detail since they would obscure the present disclosure with unnecessary detail.

Prior to describing the exemplary embodiments in detail, a writing method of the specification and drawings is described.

First, terms used in the specification and the claims adopt general terms by considering functions in various exemplary embodiments, but the terms may be changed depending on an intention of those skilled in the art, lawful or technical analysis, and emergence of new technology. Further, some terms may be arbitrarily selected by an applicant. The terms may be analyzed as meanings defined in the specification and if there is no detailed term definition, the terms may be analyzed based on general contents of the specification and an ordinary technical knowledge in the technical field.

Further, the same reference numeral or symbol written in each accompanying drawing of the specification refers to parts or components that perform substantially the same function. The present inventive concept is described by using the same reference numeral or symbol even in different exemplary embodiments for easy description and appreciation. In this aspect, although all components having the same reference numeral are illustrated in a plurality of drawings, the plurality of drawings do not necessarily refer to a single exemplary embodiment.

Further, terms including ordinal numbers such as "first", "second", and the like may be used to discriminate components from each other in the specification and claims. The ordinal numbers are used to discriminate the same or similar components from each other and meanings of the terms should not be analyzed in a limiting manner due to the use of the ordinal numbers. As one example, a use order or a layout order of a component coupled with the ordinal number should not be limited by the number. As necessary, the respective ordinal numbers may be used while being interchanged with each other.

In the specification, singular expressions used herein include plural expressions unless they have definitely opposite meanings in the context. In the present disclosure, it should be understood that term "include" or "is constituted by" indicates that a feature, a number, a step, an operation, a component, a part or the combination thereof described in the specification are present, but does not exclude a possibility of presence or addition of one or more other features, numbers, steps, operations, components, parts or combinations thereof, in advance.

In an exemplary embodiment, a term such as a 'module', 'unit', "part", or the like is a term for designating a component that performs at least one function or operation, and the component can be implemented by hardware or software or a combination of the hardware and the software. Further, a plurality of "modules", "units", "parts", or the like are integrated into at least one module or a chip to be implemented as at least one process (not illustrated) except for a case in which each of the "modules", "units", "parts", or the like must be implemented by individual specific hardware.

Further, in any particular exemplary embodiment, when any part is connected with another part, the parts may be directly connected with each other or indirectly connected with each other via another medium. In addition, unless explicitly described to the contrary, the word "comprise" and variations such as "comprises" or "comprising," will be understood to imply the inclusion of stated elements but not the exclusion of any other elements.

Hereinafter, the exemplary embodiments will be described in detail with reference to the accompanying drawings.

FIG. 1 is a diagram for describing an operation of a display system, according to an exemplary embodiment. Referring to FIG. 1, the display system 1000 displays contents. The display system 1000 of FIG. 1 may be implemented by any of a TV, a monitor, an electronic display board, an electronic picture frame, a kiosk, a cellular phone, and the like. In FIG. 1, the display system 1000 is installed in an outdoor environment and exposed to the sun, but the display system 1000 is not particularly limited thereto. For example, the display system 1000 may be installed indoors.

When light that is irradiated the sun is incident in a partial area 10 of a screen 101 of the display system 1000, contents of the corresponding area 10 are not easily discerned. Accordingly, a user may not completely recognize some aspects of the contents. As one example, if the contents include an advertisement image, when a name or a maker name, a logo, and the like of an advertisement object are displayed in the light incident area 10, an advertisement effect is significantly reduced. Alternatively, a satisfaction of the user significantly deteriorates with respect to the display system 1000 that broadcasts a live sporting event.

The display system 1000 senses characteristics of the light that is irradiated onto the display screen 101, and variably performs a display operation according to the sensing result. As a result, a visibility deterioration problem in a local area is reduced, and a visibility of the displayed contents is enhanced. In detail, a luminance of a display area may be locally increased and/or the layout or scale of the contents may be modified. Such a processing operation may be performed based on various characteristics of the light. For example, the characteristics of the light may include any one or more of illuminance, intensity, a color, an incident direction, an incident area, a distribution degree, and the like of the light.

In FIG. 1, the display system 1000 displays the contents by using one display, but the display system 1000 may include a plurality of displays. This case will be described in detail in exemplary embodiments to be described below.

Hereinafter, exemplary embodiments of displaying the contents in various methods by sensing an incident state of the light will be sequentially described.

Figure 2:
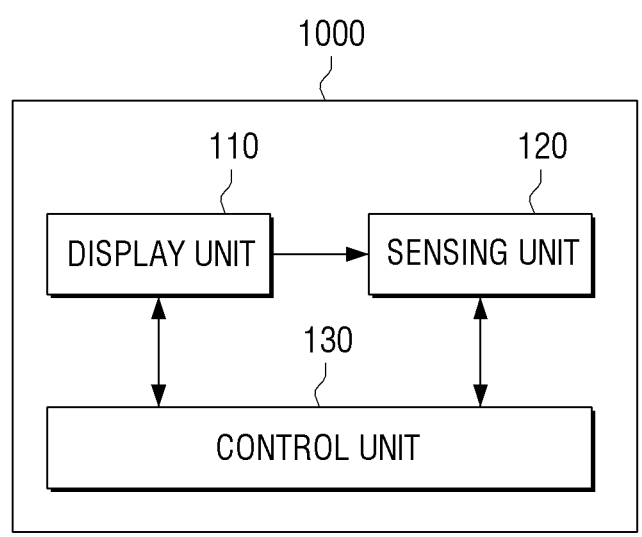
FIG. 2 is a block diagram illustrating a configuration of the display system.

FIG. 2 is a block diagram illustrating a configuration of the display system 1000. Referring to FIG. 2, the display system 1000 includes a display unit (also referred to herein as a "display device" and/or as a "display") 110, a sensing unit (also referred to herein as a "sensor") 120, and a control unit (also referred to herein as a "controller") 130.

The display unit 110 is a component which is configured for displaying the contents. According to an implementation example, the display unit 110 may be implemented by a single display or a plurality of displays.

The sensing unit 120 is a component which is configured for sensing light that is incident in the display unit 110. The sensing unit 120 may sense at least one of various characteristics including the illuminance, the intensity, the color, the incident direction, the incident area, the distribution degree, and the like of the light. According to the implementation example, the sensing unit 120 may include any one or more of an illuminance sensor, a temperature sensor, a light quantity sensing layer, a camera, or the like.

The control unit 130 locally adjusts a luminance of an area or a portion of the display unit 110 at which a visibility of the displayed contents deteriorates due to the incidence of external light in an entire display area of the display unit 110. Alternatively, the control unit 130 may include any of various types of components including a micro control unit, a microcomputer, a processor, a CPU, and the like. Further, the control unit 130 may be implemented by a system on a chip (SoC) embedded with an image processing algorithm or a field programmable gate array (FPGA) form.

When the display unit 110 is implemented by a system 1000 that includes one single display, the control unit 130 may just detect a boundary portion of the area to which the light is irradiated in the display based on the sensing result of the sensing unit 120. As a result, the luminance of the corresponding display area in the detected boundary area is adjusted upward (i.e., increased) in order to increase the visibility of the displayed contents.

Alternatively, the control unit 130 roughly detects a quadrangular area that includes the light incident area 10 in order to locally adjust the luminance of a display area that corresponds to the detected quadrangular area. For example, when the light incident area 10 is formed on an upper right portion of the display screen as illustrated in FIG. 1, the control unit 130 determines a pixel coordinate that corresponds to a leftmost boundary of the light incident area 10, a pixel coordinate that corresponds to a lowermost boundary, and a quadrangular area defined by the pixel coordinates (alternatively, pixel coordinates to which a predetermined error range is added) is set. The control unit 130 adjusts the luminance in the set quadrangular area upward in order to increase the visibility of the displayed contents.

A luminance adjusting method may be performed by using an image processing technique and/or a hardware control technique. When the image processing technique is used, the control unit 130 may modify a pixel value of a content portion that is displayed in the area where the visibility deteriorates among the contents displayed in the entire display area. When the hardware control technique is used, the control unit 130 locally adjusts a brightness value of a backlight unit or an OLED embedded in the display unit 110 to modify the luminance of the area where the visibility deteriorates. Alternatively, the control unit 130 may use both the image processing technique and the hardware control technique. This case will be described in detail below.

As another example, the display unit 110 may be a system 1000 of a type that includes a plurality of displays.

Figure 3:
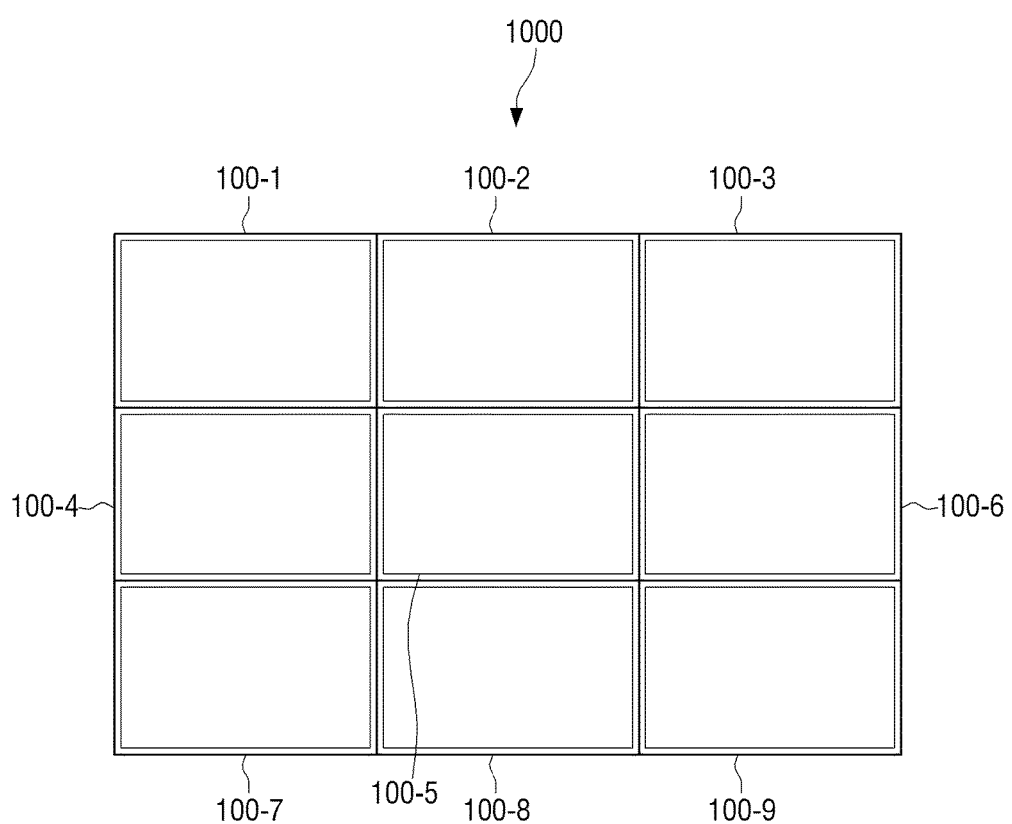
FIG. 3 is a diagram illustrating a configuration of a display system which includes a plurality of displays.

FIG. 3 is a diagram illustrating a configuration of a display system that includes a plurality of displays. The displays are combined with each other in order to display a single content. Alternatively, the plurality of displays may be referred to as a video wall or as a multivision system.

In FIG. 3, a display system 10000 which includes a total of nine displays 100-1 to 100-9 arrayed in a three-by-three array with three displays in each of a horizontal direction and a vertical direction is illustrated, but the layout form and the number of the displays may be variously modified. For example, the displays may be connected with each other in various patterns other than a matrix pattern illustrated in FIG. 3, such as, for example, a step pattern in which the displays are stacked with different numbers stepwise, a triangular pattern in which the number of stacked displays decreases on both sides based on a central axis, and the like. Detailed illustration and description of a connections structure and a connection method of the respective displays will be omitted.

As described above, the display unit 110 may be implemented in the form that includes the single display, but in the case of displays installed outdoors, there are many cases in which the plurality of displays are connected to each other similarly as the video wall in order to implement a large flat display (LFD) system. Accordingly, hereinafter, a detailed processing operation will be described by using the display system that includes the plurality of displays as an example.

Figure 4:
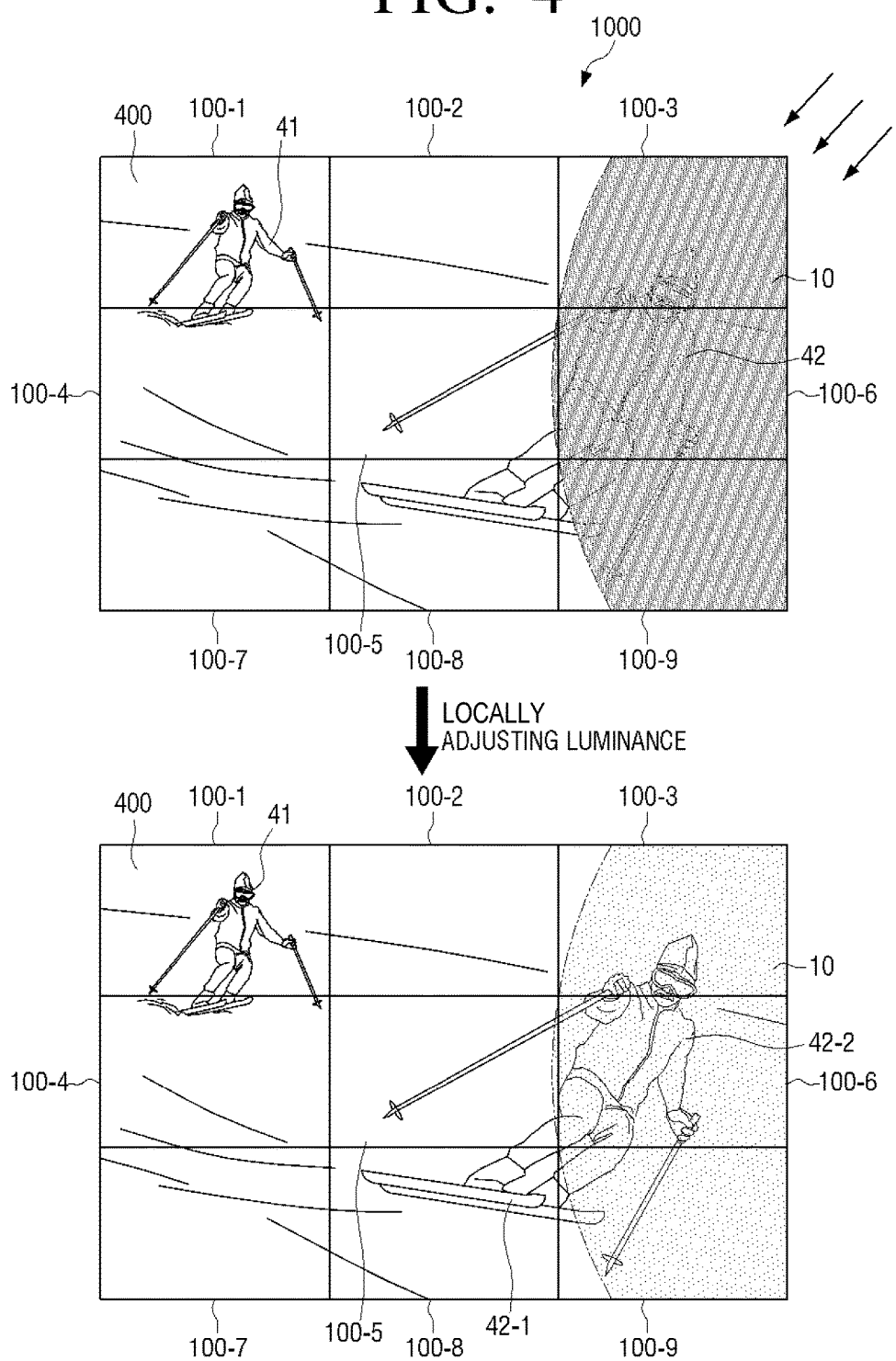
FIG. 4 is a diagram for describing an operation of a display system, according to a first exemplary embodiment.

FIG. 4 is a diagram for describing an operation of a display system, according to a first exemplary embodiment. FIG. 4 illustrates a case in which light is irradiated while the display system 1000, which includes the plurality of displays 100-1 to 100-9, displays contents 400. In the case of an actual display system, a bezel of each of the displays 100-1 to 100-9 exists as illustrated in FIG. 3, but hereinafter, a bezel area is not illustrated for easy description.

The contents 400 may include multiple objects 41 and 42. Herein, the objects may be variously implemented, such as, for example, any of an image, a text, a graphic icon, and the like.

When a partial area of the object 42 included in the contents 400 is displayed in the area to which the light is irradiated, the control unit 130 may increase the luminance of the area 10 to which the light is irradiated.

The luminance adjusting method may be performed by using at least one of the image processing technique and the hardware control technique as described above.

When the image processing technique is used, the control unit 130 may perform image processing that entails differentiating a luminance of an object part 42-2 that is being displayed in the area 10 to which the light is irradiated and a luminance of an object part 42-1 that is being displayed outside the area 10. In this case, a luminance adjustment value may be determined based on an illuminance value of the irradiated light.

When the hardware control technique is used, the luminance may be adjusted variably according to the types of the plurality of displays 100-1 to 100-9. For example, when the plurality of displays 100-1 to 100-9 use an edge type backlight unit, it is difficult for each of the displays 100-1 to 100-9 to locally adjust the luminance. In this case, the control unit 130 adjusts the luminance for the entirety of each display. In an example illustrated in FIG. 4, the control unit 130 may increase luminances of the displays 100-3, 100-5, 100-6, and 100-9, as these displays correspond to the area 10 to which the light is irradiated among the plurality of displays 100-1 to 100-9. In this case, the luminances of the respective displays 100-3, 100-5, 100-6, and 100-9 may be similarly adjusted, but are not particularly limited thereto. In particular, the luminance may be adjusted variably according to a respective size ratio of the area 10 to which the light in each of the displays 100-3, 100-5, 100-6, and 100-9 is irradiated. For example, the luminances of the displays 100-3, 100-6, and 100-9 are adjusted to be larger, because the size ratio of the corresponding portion of the area 10 with respect to the size of each of the displays 100-3, 100-6, and 100-9 is relatively large, and the luminance of the display 100-5 is adjusted to be relatively smaller, because the size ratio of the portion of the area 10 that is included in the display 100-5 is relatively small.

Alternatively, the display 100-6, which is completely included in the area 10 to which the light is irradiated, may adjust the luminance of the display itself, and the other displays 100-3, 100-5, and 100-9 may adjust the luminance of each respective pixel by using the image processing technique. In this case, smoothing processing may be performed so that the display 100-6 adjusting the backlight and the displays 100-3, 100-5, and 100-9 to which image processing is applied are seamlessly connected to each other so as to minimize a sense of difference by a viewer.

Further, the plurality of displays 100-1 to 100-9 may be manufactured by using a local dimming scheme in which light emitting elements are uniformly disposed below a display panel. In this case, the control unit 130 transmits dimming control signals to each of the plurality of respective displays 100-1 to 100-9 in order to individually adjust the luminance in the light incident area 10 for each pixel.

As described above, the luminance adjusting method may be variously implemented according to exemplary embodiments.

Figure 5:
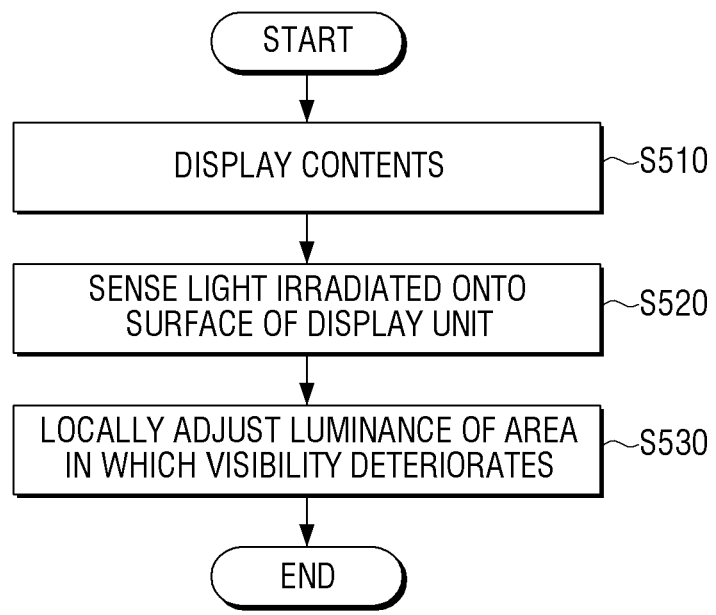
FIG. 5 is a flowchart for describing a method for enhancing visibility, according to a first exemplary embodiment.

FIG. 5 is a flowchart for describing a method for enhancing visibility, according to the first exemplary embodiment. Referring to FIG. 5, while the display system 1000 displays contents in operation S510, light irradiated onto the surface of the display unit is sensed in operation S520. A structure and a method of sensing the light will be described in detail below.

When the display system 1000 senses the light, in operation S530, a luminance of an area at which a visibility deterioration is caused by the incident light is locally adjusted in an entire display area of the display unit. As described above, as the luminance adjusting method, at least one of a method of locally changing a pixel luminance value by performing image processing of the contents themselves and a method of modifying an output luminance value of the display unit itself may be used.

Further, whether the visibility deteriorates may be determined based on the illuminance of the incident light. For example, the display system 1000 may prestore an illuminance threshold at which the visibility deteriorates for each output luminance. The illuminance threshold may be stored in the display system 1000 at the time of manufacturing, selling, installing, or updating the display system 1000. The illuminance threshold may be set based on a repetition experiment and a statistics value for various users. When the illuminance of the sensed light is less than a predetermined threshold, the display system 1000 may determine that the visibility has not deteriorated significantly, and when the illuminance is equal to or greater than the predetermined threshold, the display system 1000 may determine that the visibility deteriorates significantly.

In an exemplary embodiment, a single threshold may be set and stored. In another exemplary embodiment, a plurality of thresholds may be set. For example, when a first threshold and a second threshold are stored and the second threshold is set to a value which is smaller than the first threshold, the display system 1000 may variously classify a viewing environment by using the first threshold and the second threshold. In particular, a first area in which the illuminance of the light is greater than the first threshold may be determined as an invisible area, and a second area in which the illuminance of the light is equal to or less than the first threshold and greater than the second threshold may be determined as a visibility deterioration area. A third area in which the illuminance is less than the second threshold may be determined as a normal area. The invisible area means an area within which the visibility is at a level at which a user cannot identify the contents at all, and the visibility deterioration area means an area within which the visibility is at a level at which the user can identify the contents, but identifiability is reduced as compared with the normal area.

The display system 1000 may perform different processing functions for each area. The exemplary embodiment will be described in detail below.

Figure 6:
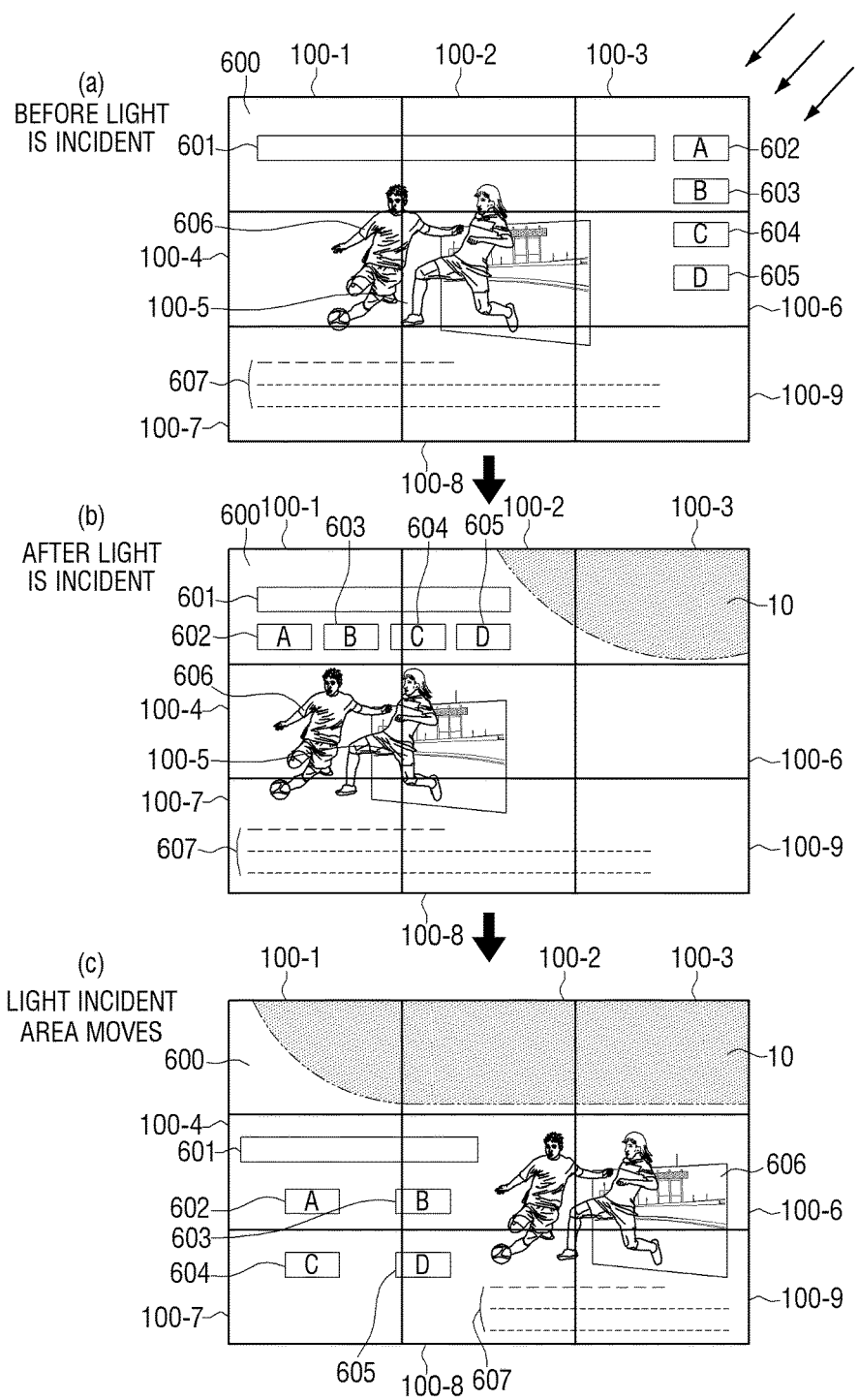
FIG. 6 is a diagram for describing a method for enhancing visibility, according to a second exemplary embodiment.

FIG. 6 is a diagram for describing a method for enhancing visibility, according to a second exemplary embodiment. According to the exemplary embodiment, when an area exists in which light is irradiated and visibility thus deteriorates, the display system 1000 may modify a layout of contents which are being displayed.

FIG. 6 is a display system 1000 that displays contents 600 which include a plurality of objects 601, 602, 603, 604, 605, 606, and 607. The contents 600 of FIG. 6 are illustrated to simulate a webpage, but the types of the contents 600 and the types of objects included in the contents 600 are not limited thereto.

First, in the top drawing (a) of FIG. 6, a content layout as displayed before the light is incident is illustrated. In this case, an address window 601 of the webpage is displayed on the top of the screen longitudinally in a horizontal direction, various menus 602, 603, 604, and 605 are arranged along a right side of the screen in a vertical direction, and an image 606 and a text 607 are displayed in a residual area of the screen.

When the light is incident in such a state, the sensing unit 120 of the display system 1000 senses the light incident area 10. In middle drawing (b) of FIG. 6, a state in which the light is incident in an upper right portion of the display unit 110 is illustrated.

When the light incident area 10 is sensed, the control unit 130 modifies the layout of the contents 600 so as to display the objects in the residual area, in order to avoid displaying any of the objects in the light incident area 10. Referring to drawing (b) of FIG. 6, a horizontal length of the address window 601 is shortened, and the menus 602, 603, 604, and 605 are modified so as to be made smaller and arranged in the horizontal direction below the address window 601.

When a time elapses in such a state, the light incident area 10 may change in accordance with a positional movement of the sun. In bottom drawing (c) of FIG. 6, a case in which the light extends from an upper right area to an upper left area is illustrated. When the sensing unit 120 senses that the light incident area 10 is modified, the control unit 130 may modify the layout of the contents 600 again. In drawing (c) of FIG. 6, the layout is modified so that the contents 600 are displayed in residual areas outside of the three upper displays 100-1, 100-2, and 100-3 among the plurality of displays. The control unit 130 may deactivate the displays 100-1, 100-2, and 100-3 that are disposed within the light incident area. Herein, the deactivation means a state in which screen viewing or touch input using the displays 100-1, 100-2, and 100-3 may be disabled, for example, by displaying a single-color screen (e.g., a blue or black screen) on each of the displays 100-1, 100-2, and 100-3 when the displays 100-1, 100-2, and 100-3 are completely turned off.

A method for changing the position of each object in drawings (a), (b), and (c) of FIG. 6 is just one example, and the exemplary embodiments are not particularly limited thereto.

In the exemplary embodiment of FIG. 6, the layout of the contents is set in various versions to be stored in the display system 1000. In this aspect, a content provider may prepare various versions of contents in different respective layouts, and thereafter, provide the prepared contents to the display system 1000. The control unit 130 selects contents of a version in which the light incident area and the object do not maximally overlap with each other at present, from among the stored versions, in order to display the selected contents via the display unit 110.

Even in the case in which the contents include a photograph image or a moving picture, when each of various versions of contents is provided, the control unit 130 may select and display contents of a most appropriate version by considering the light incident area.

Conversely, in the case where the contents include a graphic rendering screen, the control unit 130 modifies a coordinate value at which each graphic object in the contents is to be displayed arbitrarily or according to a predetermined rule in order to modify the position or size of each graphic object.

Figure 7:
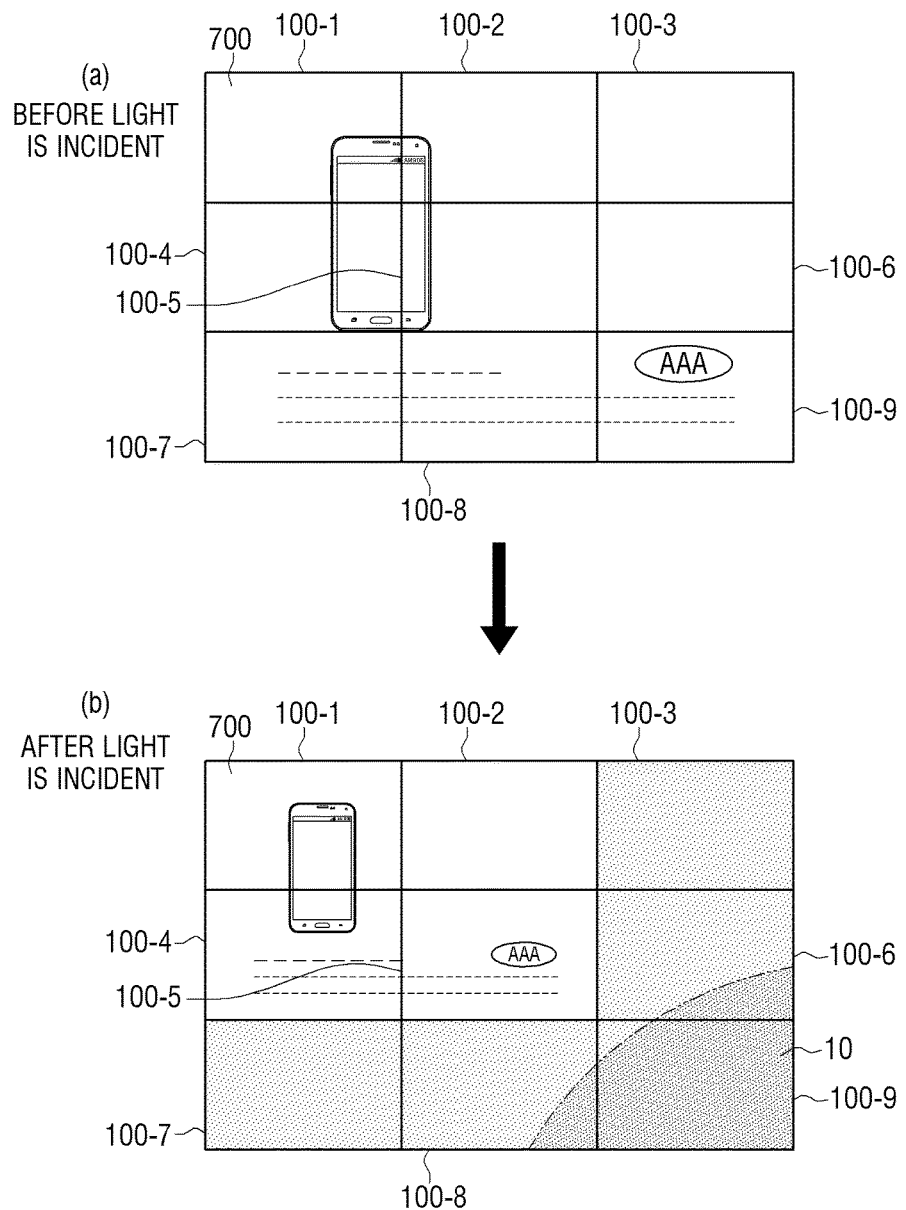
FIG. 7 is a diagram for describing a method for enhancing visibility, according to a third exemplary embodiment.

FIG. 7 is a diagram for describing a method for enhancing visibility, according to a third exemplary embodiment. According to the exemplary embodiment illustrated in FIG. 7, when an area exists in which light is irradiated and visibility thus deteriorates, the display system 1000 may modify the scale of the contents which are displayed.

Top drawing (a) of FIG. 7 illustrates an operation of the display system 1000 before the light is incident. The display system 1000 displays one content 700 by using all of the displays 100-1 to 100-9. When the light is incident in such a state, the sensing unit 120 may sense the light incident area.

The control unit 130 modifies the scale of the contents so that the content 700 is displayed in residual display areas outside of the light incident area. Bottom drawing (b) of FIG. 7 illustrates a case in which the light is incident on a lower right corner portion 10 of the display unit. The control unit 130 shortens horizontal and vertical lengths of the contents so that the contents are displayed in residual areas outside of the displays 100-6, 100-8, and 100-9 which correspond to the light incident area 10. The control unit 130 displays the content 700 in four displays 100-1, 100-2, 100-4, and 100-5 and deactivates the displays 100-6, 100-8, and 100-9 that correspond to the light incident area 10. In order to adjust horizontal and vertical ratios, the displays 100-3 and 100-7 in which the light is not incident may also be deactivated together, but this is just one example, and when the horizontal and vertical ratios need not be adjusted, the content 700 may be displayed by using all of the displays in which the light is not incident. In this case, the layout of the content may also be modified in addition to modifying the scale of the contents.

Figure 8:
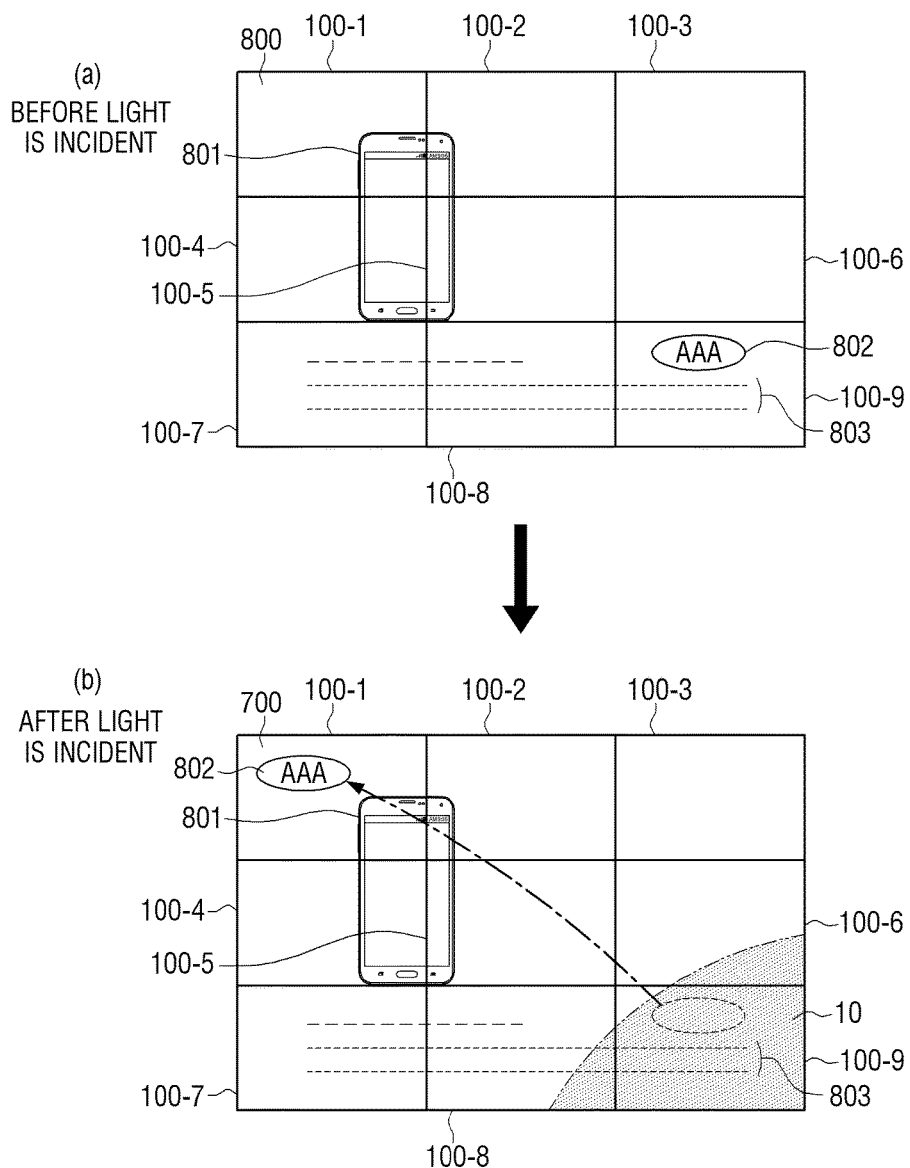
FIG. 8 is a diagram for describing a method for enhancing visibility, according to a fourth exemplary embodiment.

FIG. 8 is a diagram for describing a method for enhancing visibility, according to a fourth exemplary embodiment. According to the exemplary embodiment, when an area exists in which light is irradiated and the visibility thus deteriorates, the display system 1000 may move the positions of one or more objects among the plurality of objects that are included in the contents which are displayed.

Top drawing (a) of FIG. 8 illustrates a display system 1000 that displays contents 800 which include a plurality of objects 801, 802, and 803. When the light is incident in a lower right area 10 in such a state, the control unit 130 modifies the contents 800 as illustrated in bottom drawing (b) of FIG. 8. In this case, only a primary object 802 from among the objects 802 and 803 that are originally displayed in the light incident area 10 moves to an upper left position in which the light is not incident, unlike the exemplary embodiment illustrated in FIG. 6. The primary object 802 may include a name or a maker name, a logo, and the like of an advertisement object, but is not particularly limited thereto. When the contents 800 include movie contents, subtitle information may correspond to the primary object 802.

The control unit 130 moves only the primary object 802 among the objects in the light incident area 10 to another position. The modification method may be achieved similarly to the modification of the layout.

For example, the display system 1000 may store all of a plurality of contents in accordance with different versions in which the primary object is displayed at various positions. In an example of FIG. 8, the display system 1000 has stored a version in which the primary object 802 is positioned on a lower right end as a default and additionally stores various versions of contents in which the primary object 802 is displayed at various positions which include an upper right end, an upper left end, a lower left end, the center of the screen, and the like. The control unit 130 selects one of the stored versions of contents and displays one selected version so as to prevent the visibility with respect to the primary object 802 from being deteriorated by the incident light. Various versions of contents may be provided even with respect to various graphic screens, in addition to a still image and the moving picture.

As another example, an object identification (ID) and other attribute information may be associated with each object in the contents. The control unit 130 verifies an attribute of an object displayed in the light incident area 10 in order to determine the importance of the object. For example, the object may be set to be higher in importance than a product image, with respect to a specific mark or a text. When the control unit 130 determines that the object is higher in importance, the control unit 130 may modify a display coordinate value of an ID of the corresponding object.

In FIGS. 6, 7, and 8, when the light incident area 10 is sensed, various exemplary embodiments of modifying the layout or scale of the contents based on the position or size of the incident area are illustrated, but when the illuminance is low even though the light is incident, the layout or scale need not particularly be modified. In particular, when an invisible area which may not be recognized exists due to the incidence of the light among all of the display areas of the display unit 110 or a visibility deterioration area exists in which recognition is possible, but identifiability deteriorates, the control unit 130 of the display system 1000 may modify the layout of the contents or the horizontal and vertical lengths so that the objects are displayed in areas other than the invisible area.

In FIGS. 6, 7, and 8, various exemplary embodiments which are discriminated according to a processing scheme of the control unit have been described. Illustration and description of a separate flowchart for the exemplary embodiments of FIGS. 6, 7, and 8 will be omitted.

Hereinabove, the control unit modifies the contents by using any of various schemes according to the exemplary embodiments, but the exemplary embodiments are combined with each other to be applied. In detail, the control unit 130 may perform different processing stepwise or for each area according to an illuminance degree of the light.

Figure 9:
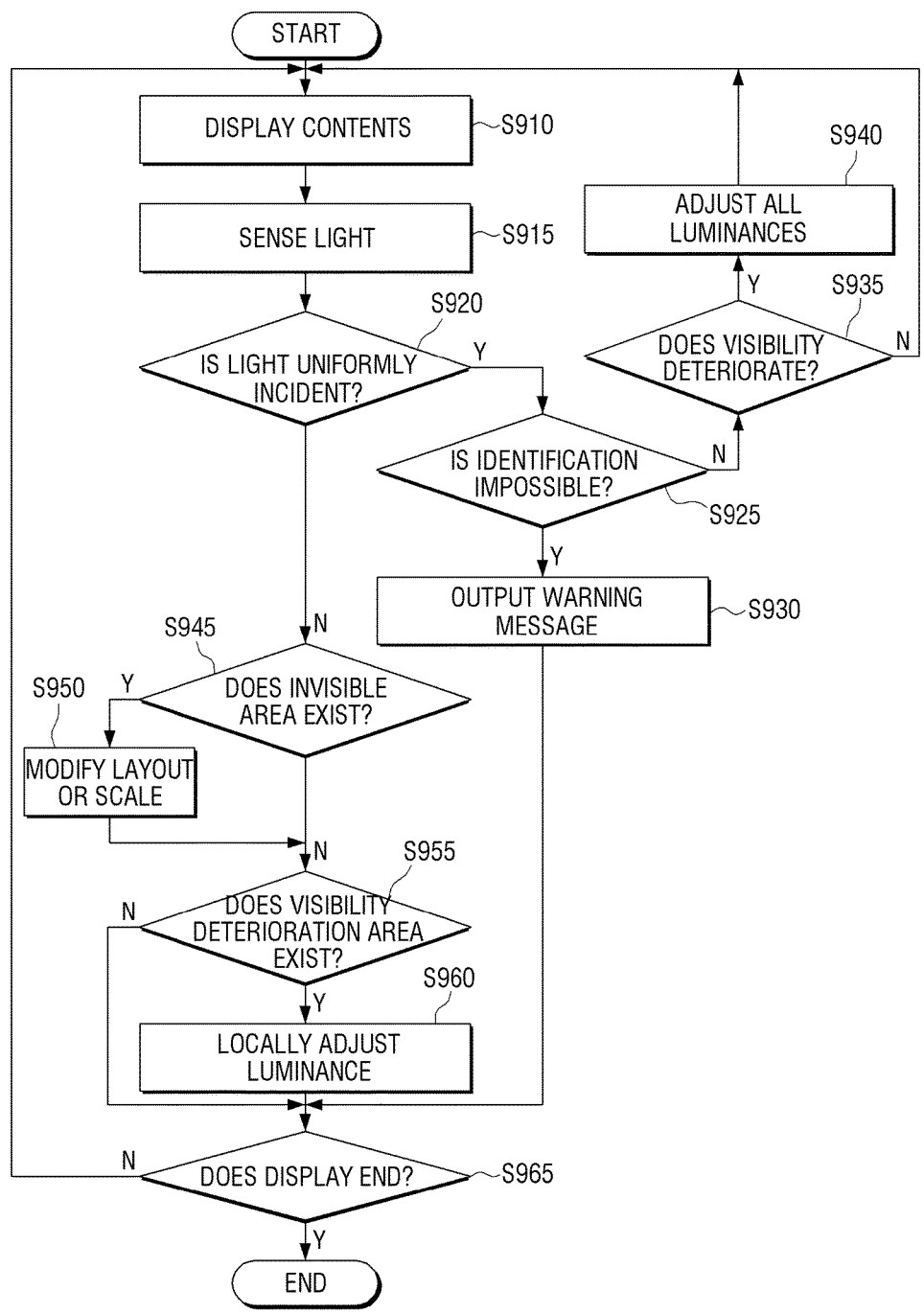
FIG. 9 is a flowchart for describing yet another exemplary embodiment, which combines and uses various processing algorithms.

FIG. 9 is a flowchart for describing yet another exemplary embodiment, in which various processing algorithms are combined and employed.

Referring to FIG. 9, in operation S910, the display system 1000 displays contents. In such a state, in operation S915, light that is incident on a display screen is sensed. Herein, the light may include direct sunlight, but may correspond to all light that may deteriorate visibility. For example, the light may be reflected light or light by other illuminations.

When the control unit 130 senses the light, in operation S920, the control unit 130 determines whether the light is uniformly incident in all display areas. The uniformity may be determined based on an illuminance distribution on the display screen. In the case where the sensing unit 120 includes a plurality of illuminance sensors, when illuminance values of the light sensed by the plurality of illuminance sensors are nonuniform, the control unit 130 interpolates the illuminance values to generate a light intensity map that corresponds to all display areas. As a result, the uniformity may be determined based on the light intensity map. The uniformity may be determined based on a predetermined error range. An interpolation method and the light intensity map will be described in detail below.

When the control unit 130 determines that the illuminances of all of the display areas are uniform, the control unit 130 determines whether identification is impossible based on the intensities of the illuminances in operation S925. When the control unit 130 determines that the illuminances have illuminance values which are greater than a predetermined threshold, the control unit 130 may determine that the identification is impossible. When the control unit 130 determines that the identification is impossible, the control unit 130 outputs a warning message in operation S930. The warning message may be output as a visual message via the display unit 110 provided in the display system 1000 or output as a sound message via a speaker (not illustrated). Alternatively, if there is a host device or a user terminal device which is separately provided, the warning message may be transmitted to the device. Alternatively, the warning message is output for a predetermined time and thereafter, the entire display system is automatically turned off or the display unit 110 is deactivated in order to reduce power consumption.

Conversely, when the control unit 130 determines that the identification is not impossible, the control unit 130 determines whether the illuminance is of a degree such that the visibility deteriorates in operation S935. Whether the identification is impossible and whether the visibility deteriorates may be determined based on different thresholds. As one example, when an average illuminance is greater than a first threshold, the control unit 130 may determine that the identification is impossible. When the average illuminance is greater than a second threshold which is smaller than the first threshold and equal to or less than the first threshold, the control unit 130 may determine that the visibility deteriorates. The control unit 130 may determine that the visibility is normal when the average illuminance is equal to or less than the second threshold. When the control unit 130 determines that the visibility deteriorates in operation S935, the control unit 130 adjusts luminances of all display areas in operation S940. In detail, the control unit 130 may increase the luminance based on the size of the illuminance of the incident light.

When the control unit 130 determines that the illuminance distribution in all of the display areas is not uniform in operation S920, the control unit 130 determines whether an invisible area locally exists in operation S945. The control unit 130 may determine whether the invisible area exists via the comparison with the first threshold as described above. When the control unit 130 determines that the invisible area is locally generated, in operation S950, the control unit 130 modifies the layout and/or the scale of the display of the contents. Since the layout or scale modifying method has already been described in the aforementioned various exemplary embodiments, a detailed description thereof will be omitted.

When the invisible area does not exist, in operation S955, the control unit 130 determines whether the visibility deterioration area exists. The control unit 130 may determine whether the visibility deterioration area exists via the comparison with the second threshold as described above. When the control unit 130 determines that the visibility deterioration area is locally generated, in operation S960, the control unit 130 locally adjusts the luminance of the visibility deterioration area.

The control unit 130 performs the aforementioned control operation until the display operation of the display system 1000 ends, as determined in operation S965, in order to enhance the visibility.

In FIG. 9, it is illustrated and described that the invisible area is first determined and thereafter, the visibility deterioration area is determined, but the sequence may be modified. Further, yet another exemplary embodiment that may enhance the visibility may be added to the process illustrated in FIG. 9. As one example, when a fixing part that fixes the display system is constituted by a hinge and a motor, the control unit 130 drives the motor to modify the layout pattern of the display unit 110. In detail, the control unit 130 may rotate the motor so that a right edge of the display unit 110 moves toward the user and a left edge of the display unit 110 moves in an opposite direction thereto. Alternatively, the control unit 130 may rotate the motor so that an upper edge moves toward the user and a lower edge moves in an opposite direction thereto. When the light incident area is formed at an edge or a corner of the display area, the control unit 130 may move the display unit by driving the motor so as to minimize the light incident area. The exemplary embodiment will be described in detail below.

As described above, the display system 1000 senses the light incident upon the surface of the display unit in order to perform the control operation for offsetting or minimizing an influence by the light. Hereinafter, examples of a structure and a method for sensing the light in the display system 1000 will be described in detail.

Figure 10:
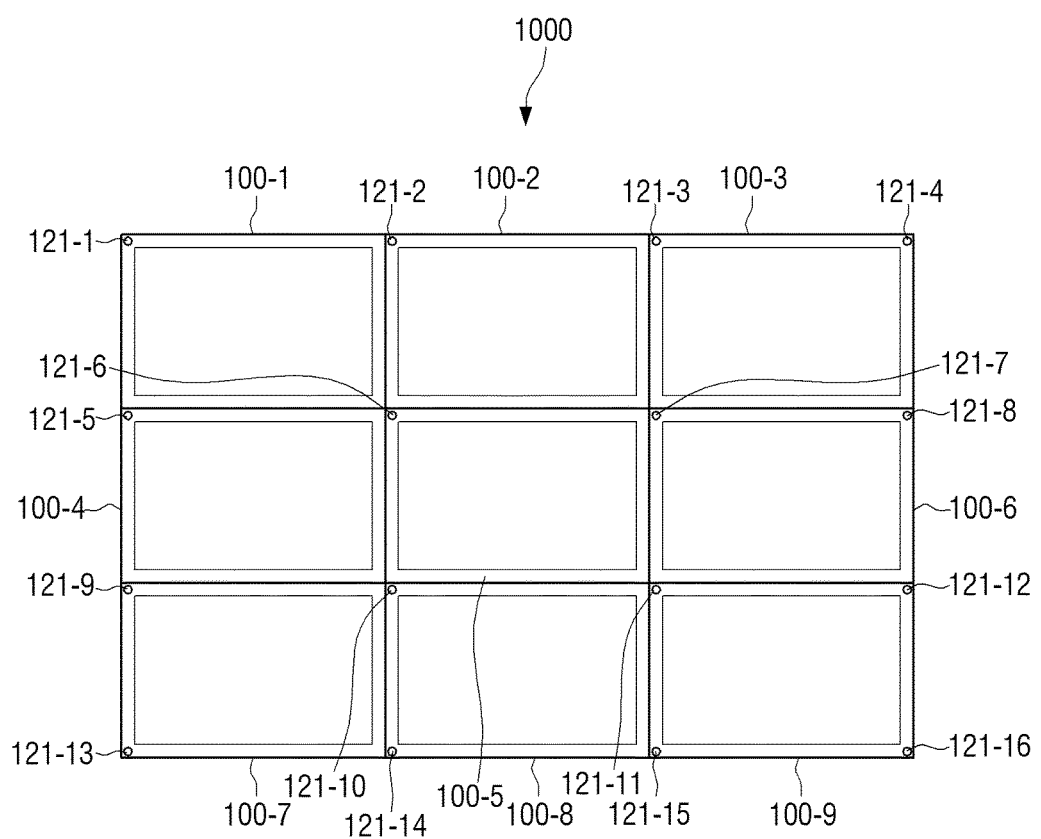
FIG. 10 illustrates a case in which a plurality of illuminance sensors are disposed in a front direction of the display system.

FIG. 10 illustrates a case in which a plurality of illuminance sensors are disposed in a front direction of the display system 1000. Herein, a front surface means a surface on which the display unit of the display system 1000 is disposed.

As illustrated in FIG. 10, in the case of the display system including the plurality of displays 100-1 to 100-9, the sensing unit 120 includes connectors among the plurality of displays and a plurality of illuminance sensors 121-1 to 121-16 distributed in at least a part of the bezel area. In FIG. 10, a case in which an edge of each display 100-1 to 100-9 is formed by a bezel is illustrated. Further, a case in which the plurality of illuminance sensors 121-1 to 121-16 are uniformly disposed at connection points among the respective displays 100-1 to 100-9 and corners of all display units is illustrated. The illuminance sensors 121-1 to 121-16 are manufactured separately from the displays 100-1 to 100-9 to be attached or connected, but are not particularly limited thereto. For example, the illuminance sensors may be manufactured integrally within the bezel areas of the respective displays 100-1 to 100-9. In detail, the plurality of displays 100-1 to 100-9 in which the illuminance sensors are fixedly disposed at upper left corners may be connected. When a sufficient number of illuminance sensors are uniformly distributed as illustrated in FIG. 10, the control unit 130 may immediately generate the light intensity map by using a respective value sensed by each illuminance sensor. The light intensity map corresponds to data which is generated to match the patterns of all of the display areas in order to record an illuminance value for each area. In this aspect, when the bezel is omitted or the bezel size is small, it may be spatially difficult to arrange the illuminance sensors among the displays. In this case, a minimum number of illuminance sensors are disposed, and sensing values of the illuminance sensors are interpolated in order to generate the light intensity map.

Figure 11:
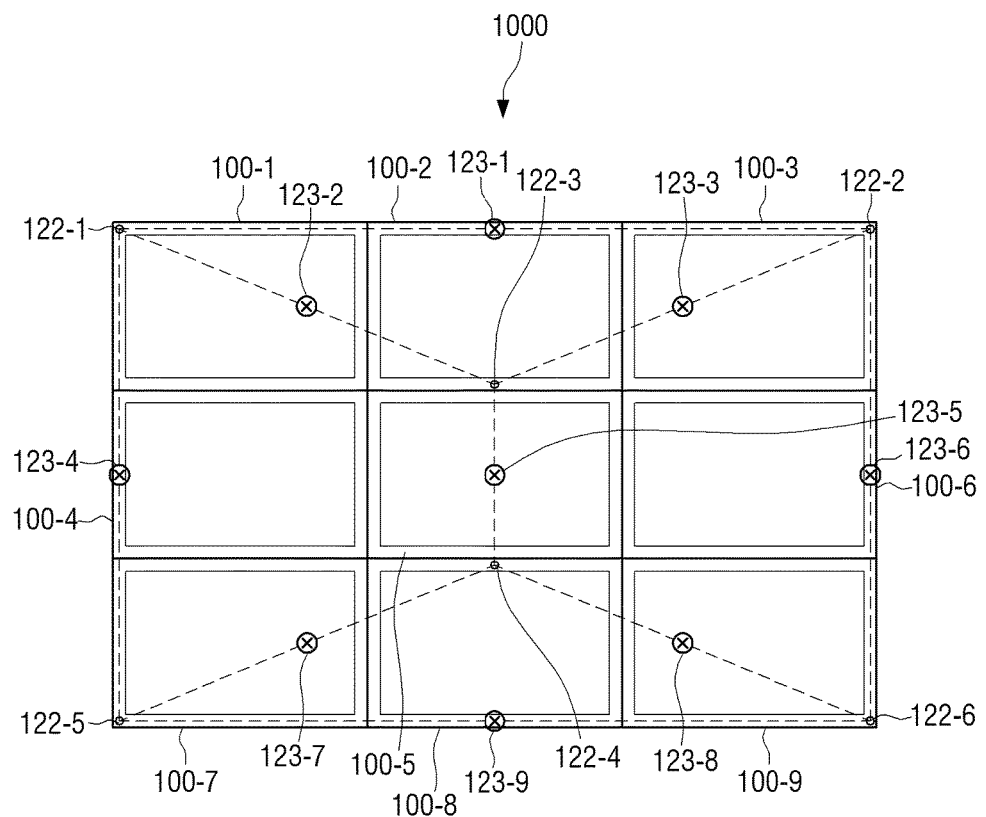
FIG. 11 is a diagram for describing an exemplary embodiment using a smaller number of illuminance sensors than the size of the entire display area.

FIG. 11 is a diagram for describing an exemplary embodiment in which a smaller number of illuminance sensors are used with respect to the size of the entire display area.

The display system 1000 may generate the light intensity map by interpolating the illuminance values sensed by the illuminance sensors, and may distinguish the visibility deterioration area, the invisible area, the normal area, and the like by using the light intensity map. In the display system which includes the plurality of displays, when cost and a bezel space are considered, a smaller number of illuminance sensors corresponds to a reduced cost and a more advantageous requirement with respect to bezel space. As a result, in FIG. 11, a case in which a total of six illuminance sensors 122-1 to 122-6 are disposed at corner areas and center areas of all display units 100-1 to 100-9 is illustrated.

The control unit 130 interpolates sensing values obtained by the respective illuminance sensors 122-1 to 122-6 in order to determine approximate luminances in all areas. Various methods may be applied as an interpolation method. For example, the illuminances may be calculated by using at least one of various interpolation methods, including nearest neighbor interpolation or piecewise constant interpolation that interpolates peripheral illuminances by referring to a value of a sensor which is nearest, bilinear interpolation that calculates and interpolates a linear sum of values acquired by multiplying four values that surround the periphery by a weighted value, cubic convolution interpolation that performs interpolation for each row and thereafter, performs interpolation for each column again, spline interpolation that performs interpolation by using a cubic polynomial expression, linear interpolation that calculates an approximated interpolation value by using a linear equation linking two points, and the like.

In addition, any of various interpolation methods including polynomial interpolation that performs interpolation by making a polynomial expression, Chebyshev polynomial interpolation, Lagrange polynomial interpolation, Nevile's repetition interpolation, interpolation by a Newton polynomial expression, a Newton's divided difference method, and the like may be used.

In FIG. 11, a method for interpolating the illuminance value by using basic linear interpolation is described. As described above, the linear interpolation is a method that linearly links two points and linearly estimates a value therebetween.

In the display system 1000 of FIG. 11, four illuminance sensors 122-1, 122-2, 122-5, and 122-6 are disposed at respective corners and two illuminance sensors 122-3 and 122-4 are disposed at a central portion. The control unit 130 determines an intermediate point among the illuminance sensors 122-1, 122-2, 122-5, and 122-6 at the corners and estimates an intermediate value of illuminance values sensed by the respective illuminance sensors 122-1, 122-2, 122-5, and 122-6 as an illuminance value of the intermediate point. For example, when an illuminance value of a first illuminance sensor 122-1 is 50000 (Lux) and an illuminance value of a second illuminance sensor 122-2 is 100000 (Lux), an illuminance value of an intermediate point 123-1 becomes 75000 (Lux), because the intermediate point 123-1 is located exactly halfway between sensor 122-1 and sensor 122-2 along a horizontal line that connects the two sensors 122-1 and 122-2.

By a similar method, the control unit 130 may estimate illuminance values of intermediate points 123-1 to 123-9 by using the respective luminance sensors 122-1 to 122-6. Then, a more minute light intensity map may be generated by estimating a secondary illuminance value of a secondary intermediate point again among estimated intermediate points 123-1 to 123-9.

In FIGS. 10 and 11, a case in which the sensing unit includes an illuminance sensor exposed to the outside is described, but the sensing unit may be embedded in the display.

FIG. 12 is a diagram for describing a configuration of the sensing unit embedded in the display. Referring to FIG. 12, each display includes a display panel 111. The display panel 111 may be implemented by using any of various types of panels which include, for example, an organic light emitting diode (OLED), an EL display, an electrophoretic display (EPD), an electrochromic display (ECD), a liquid crystal display (LCD), an AMLCD, a plasma display panel (PDP), and the like.

The sensing unit 120 includes a light quantity sensing layer 125 which is disposed in a rear direction of the display panel 111. When the display panel 111 is the LCD, a backlight unit 112 is required and in this case, the light quantity sensing layer 125 may be disposed between the display panel 111 and the backlight unit 112.

The light quantity sensing layer 125 may be implemented by a layer in which various sensors 125-1, which may include, for example, any one or more of a charge-coupled device (CCD) or a complementary metal-oxide semiconductor (CMOS), a red-green-blue (RGB) sensor or an illuminance sensor, and the like are embedded, but is not limited thereto. Further, a basic board of the light quantity sensing layer 125 may be manufactured by a transparent material so that backlight provided by the backlight unit 112 on a rear surface is not blocked by the light quantity sensing layer 125, but instead provided toward the display panel 111.

When the light quantity sensing layer 125 is disposed on the rear surface of the display panel 111, the quantity of light incident in the light quantity sensing layer 125 may be relatively small, or no light may be incident in the light quantity sensing layer 125 while the display panel 111 displays contents. By considering such a point, the control unit 130 frequently or periodically deactivates the display panel 111 in order to enable the light to be transmitted through the display panel 111.

For example, when the display system 1000 is an LFD installed outdoors, a primary purpose may be to output an advertisement. Accordingly, the display panel 111 is deactivated during a black-out time between advertisements for a purpose of transferring external light to the light quantity sensing layer 125.

Top drawing (a) of FIG. 12 illustrates a state in which the display panel 111 is operating, and bottom drawing (b) of FIG. 12 illustrates a state in which the display panel 111 is deactivated. As illustrated in drawing (b) of FIG. 12, the control unit 130 senses the quantity of the light sensed by the light quantity sensing layer 125 while deactivating the display panel 111 in order to generate the aforementioned light intensity map.

When the light quantity sensing layer 125 is used as illustrated in FIG. 12, reliability is improved, as compared with an exemplary embodiment that uses an external illuminance sensor, because in the latter case, it is impossible to more precisely sense and control luminance in the entire display area. Further, since a gray-scale based low bit sensor may be used, cost may be reduced.

In FIG. 12, a case in which the light quantity sensing layer 125 is provided separately from the backlight unit 112 and thus disposed in front of the backlight unit 112 is illustrated, but is not particularly limited thereto. For example, the light quantity sensing layer 125 may be implemented integrally with the backlight unit 112. In detail, the sensors 125-1 such as the CCD and the like may be disposed in an available space on the backlight unit 112. The respective sensors 125-1 are arranged in parallel with or spaced apart from light emitting elements (not illustrated) in the backlight unit 112 by a predetermined distance in order to sense a light quantity. Alternatively, in some exemplary embodiments, the light quantity sensing layer 125 may be disposed in the rear of the backlight unit 112.

Figure 13:
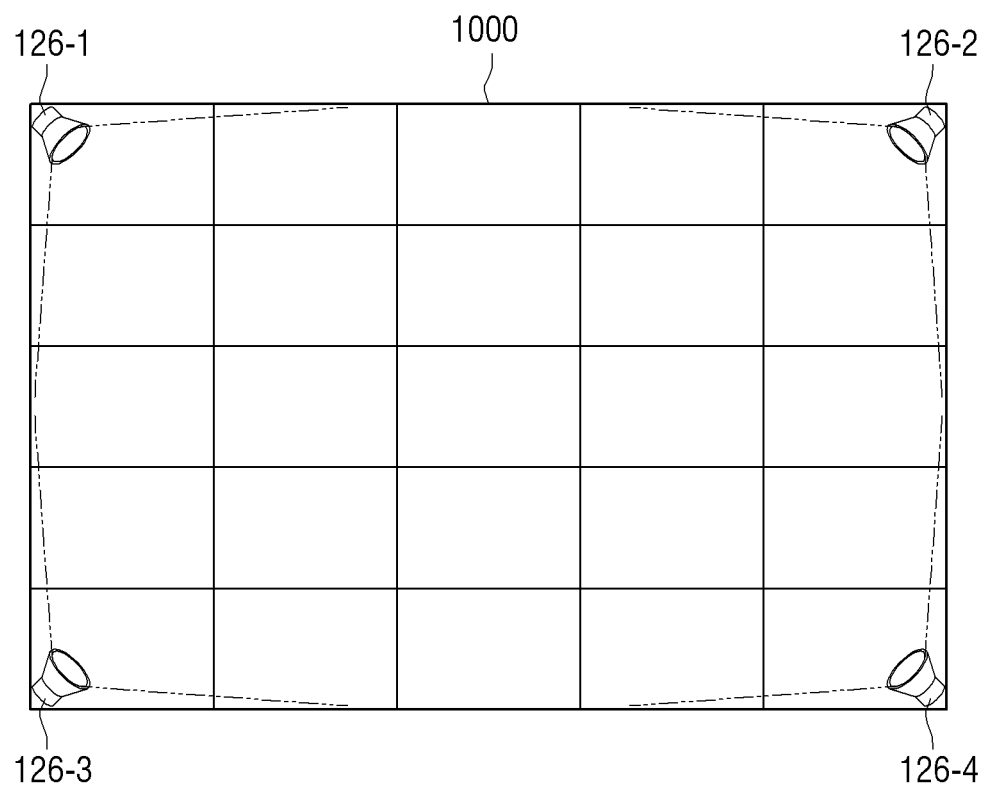
FIGS. 13 and 14 are diagrams for describing, in detail, a method for sensing light by using a camera.
Figure 14:
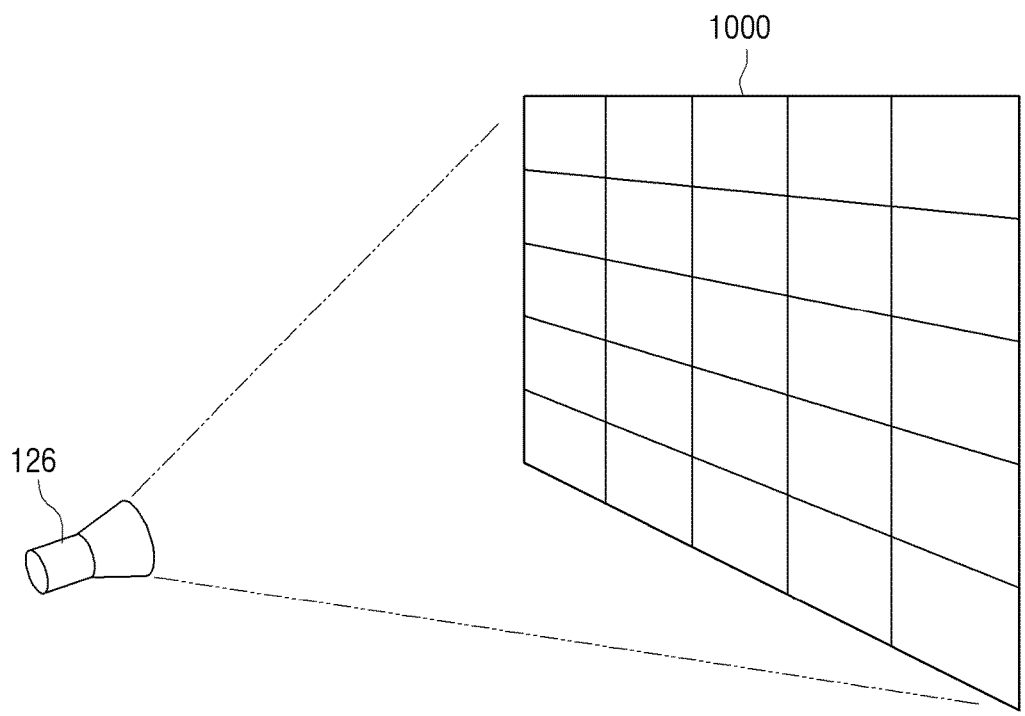

Various sensors are used in the above exemplary embodiments, but the sensing unit may sense light by using a camera. FIGS. 13 and 14 are diagrams for describing, in detail, a method for sensing light by using a camera.

FIG. 13 illustrates a display system having a structure in which a plurality of cameras are directly connected to each other. Referring to FIG. 13, four cameras 126-1, 126-2, 126-3, and 126-4 are disposed in a pattern and configured to photograph a display screen at each respective corner area of the display unit of the display system 1000.

The control unit 130 analyzes images photographed by the respective cameras 126-1 to 126-4 in order to determine an area in which the light is incident. In detail, the control unit 130 divides the respective photographed images into a plurality of blocks and thereafter, calculates a representative pixel value of each block. The control unit 130 compares a representative pixel value of a corresponding block in an original image and the representative pixel value of each block in the photographed image with each other in order to determine that a visibility deterioration area and/or an invisible area exists when both representative pixel values are different from each other by at least a predetermined level.

FIG. 14 illustrates a display system that senses light by using an external camera. Referring to FIG. 14, one external camera 126 is disposed at a position so as to photograph the display screen of the display system 1000. An image photographed by the camera 126 may be provided to the control unit 130 of the display system 1000 via any of various wired or wireless communication interfaces. Alternatively, when the control unit 130 of the display system 1000 is not embedded in the system 1000 but provided in a host device or a user terminal device which is separately provided, the photographed image may be provided to the host device or user terminal device. The control unit 130 analyzes the photographed image to determine the locations of a visibility deterioration area and/or an invisible area as described above.

Figure 15:
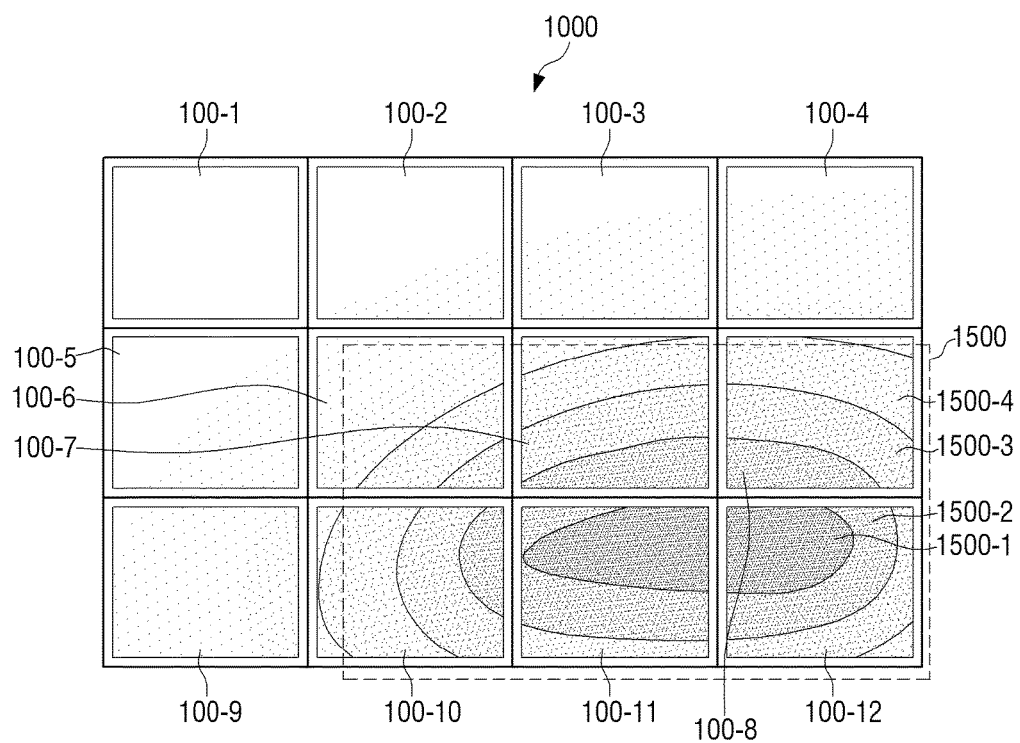
FIG. 15 is a diagram for describing a method for determining a light incident area based on a sensing result obtained by the sensing unit.

FIG. 15 is a diagram for describing a method for determining the light incident area based on a sensing result obtained by the sensing unit. In FIG. 15, a case in which light is incident in a lower right area in a display system that includes a total of twelve displays is illustrated.

The control unit 130 may determine an area in which watching is influenced due to incidence of light, that is, a region of interest (ROI), by applying any of various methods.

As one example, the control unit 130 may determine the ROI by using a threshold. The control unit 130 sets at least one threshold in order to divide the areas based on the threshold. The control unit 130 may adjust the luminance to different luminance values for each divided area. For example, the control unit 130 may adjust the luminances of pixels having an illuminance which is greater than 10000 Lux and equal to or less than 12000 Lux to a luminance of 500 candela, and may adjust the luminances of pixels having an illuminance which is greater than 12000 Lux and equal to or less than 14000 Lux to a luminance of 600 candela.

As another example, the control unit 130 determines points where an average illuminance of a patch is more than a threshold by sequentially monitoring all display areas with a patch constituted by a plurality of pixels, and thereafter, smoothly combines extracted patches in order to extract the region of interest (ROI).

According to yet another example, the control unit 130 may adjust the illuminance by using a quantization method. In detail, the control unit 130 quantizes the illuminance values sensed by the illuminance sensors and the illuminance values calculated by applying an interpolation in order to group the quantized illuminance values into a plurality of groups. The control unit 130 may determine whether a particular area is included in the ROI or not on a group-by-group basis. For example, the illuminance which may be measured outdoors is in the range of approximately 0 Lux to 120000 Lux. When it is assumed that each of display of the display system 1000 may express brightness at 256 levels, the control unit 130 quantizes 120001 types of sensing values having an illuminance range of 0 Lux to 120000 Lux into 256 groups. The control unit 130 maps the quantized groups and the display luminances to be used.

In FIG. 15, one example of the light intensity map generated by using the illuminance is illustrated. Further, in FIG. 15, various areas 1500-1, 1500-2, 1500-3, and 1500-4 which are divided based on the intensity of the illuminance on the light intensity map are illustrated. The control unit 130 may perform different processing functions for each respective area by comparing the illuminance intensities of the respective areas with a threshold.

For example, the control unit 130 may determine areas including a first area 1500-1 having the highest illuminance to a second area 1500-2 and a third area 1500-3 as the region of interest (ROI) in which the visibility deteriorates. In this case, only the luminance in the third area 1500-3 may be adjusted upward along a boundary of the third area 1500-3 which is most outside.

Alternatively, the control unit 130 may roughly estimate the ROI without using the area boundary. In FIG. 15, a case in which a quadrangular area 1500 that includes the third area 1500-3 is estimated as the ROI is illustrated.

As yet another example, the control unit 130 may control displays in which the ROI exists among the plurality of displays 100-1 to 100-12 on a display-by-display basis. In particular, in FIG. 15, the control unit 130 may determine that the sixth, seventh, eighth, tenth, eleventh, and twelfth displays 100-6, 100-7, 100-8, 100-10, 100-11, and 100-12 correspond to the ROI.

When the ROI is determined, the control unit 130 may enhance the visibility by adjusting the luminance, modifying the layout of the contents, and/or adjusting the scale as described above.

In this aspect, it has been described that the display system 1000 includes the display unit 110, the sensing unit 120, and the control unit 130 in the above exemplary embodiments, but the display unit 110 may be implemented by the plurality of displays as described above. For example, a plurality of display devices may be connected to each other by using a modulator, a peanut ring, and the like to form one large display wall in order to implement the LFD. Layout positions of the control unit 130 and the sensing unit 120 may vary according to an implementation form of the display unit 110. Hereinafter, various implementation examples of the display system using the plurality of displays will be described in detail.

Figure 16:
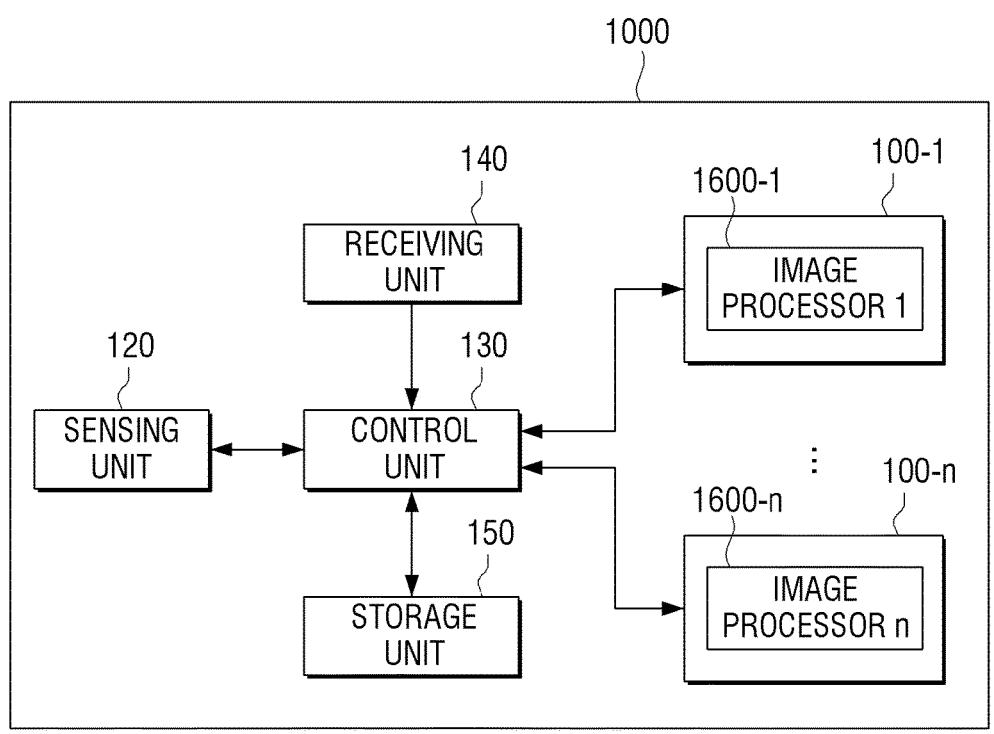
FIG. 16 is a block diagram illustrating one example of an internal configuration of the display system.

FIG. 16 is a block diagram illustrating one example of an internal configuration of the display system. Referring to FIG. 16, the display system 1000 includes a plurality of displays 100-1 to 100-*n*, a sensing unit 120, a control unit 130, a receiving unit (also referred to herein as a "receiver") 140, and a storage unit (also referred to herein as a "storage device") and/or as a "storage") 150.

The plurality of displays 100-1 to 100-*n* include image processors 1600-1 to 1600-*n*, respectively. The respective image processors 1600-1 to 1600-*n* perform image processing operations in the corresponding displays 100-1 to 100-*n*. In detail, each of the image processors 1600-1 to 1600-*n* may perform calibration for adjusting attributes such as a color sense or luminance, a white balance, and the like according to respective characteristics of each of the displays 100-1 to 100-*n*. In addition, the plurality of displays 100-1 to 100-*n* may further include any one or more of various components such as, for example, a display panel, a buffer, an interface, and the like, but detailed description and illustration thereof are omitted.

The display system 1000 includes a control unit 130 which is configured for controlling an operation of each of the displays 100-1 to 100-*n*. The control unit 130 controls an overall operation of the display system 1000.

The sensing unit 120 senses light incident in each of the displays 100-1 to 100-*n* of the display system 1000. Since the configuration example of the sensing unit 120 and the sensing method by the sensing unit 120 have been described in detail above, duplicated description thereof is omitted.

The receiving unit 140 is a component which is configured for receiving contents data from the outside. In detail, the receiving unit 140 may include a wired or wireless communication module that receives the contents data from a server device or other terminal devices via any of various wired/wireless interfaces. Alternatively, the receiving unit 140 may include an antenna, a demodulator, an equalizer, and the like for receiving a broadcasting signal transmitted from a broadcasting station.

The storage unit 150 may store various programs and/or data required for an operation of the display system 1000.

The control unit 130 detects the contents data received by the receiving unit 140 and/or the data stored in the storage unit 150 in order to provide the detected data to the plurality of displays 100-1 to 100-*n*.

In this aspect, the image processing operations including the luminance control, the modification of the contents layout, the modification of the contents scale, and the like described in the aforementioned various exemplary embodiments may be directly processed by the control unit 130 or processed by image processors 1600-1 to 1600-*n* in each of the displays 100-1 to 100-*n* in some exemplary embodiments.

As one example, when the plurality of displays 100-1 to 100-*n* are configured to be combined to each other to display one single content, the control unit 130 may regenerate an entire contents screen by decoding contents data to be displayed, and may perform processing that entails locally adjusting the luminance or layout modification processing, scale modification processing, and the like with respect to a part corresponding to the ROI in the regenerated contents screen. When such processing is completed, the control unit 130 divides the contents screen into a plurality of sub screens according to a layout pattern of each of the displays 100-1 to 100-*n* and thereafter, provides the divided sub screens to each of the displays 100-1 to 100-*n*. The image processors 1600-1 to 1600-*n* in each of the displays 100-1 to 100-*n* may individually process and display each of the provided sub screens according to the display characteristics.

As another example, the control unit 130 may determine the ROI based on a sensing result of the sensing unit 120 and thereafter, provide information that relates to the ROI to each of the displays 100-1 to 100-*n* together with each sub screen data. In this case, the image processors 1600-1 to 1600-*n* in each of the displays 100-1 to 100-*n* may directly perform image processing for a respective sub screen which each image processor is to display based on the provided information that relates to the ROI. Alternatively, when the luminance is adjusted by a hardware control technique, the control unit 130 may provide a luminance adjustment command or a dimming control signal to a display that is configured to display the contents area which includes the ROI. The display that receives the luminance adjustment command controls a backlight unit in order to adjust the luminance. The hardware based luminance adjusting method may be variously performed as described above.

Figure 17:
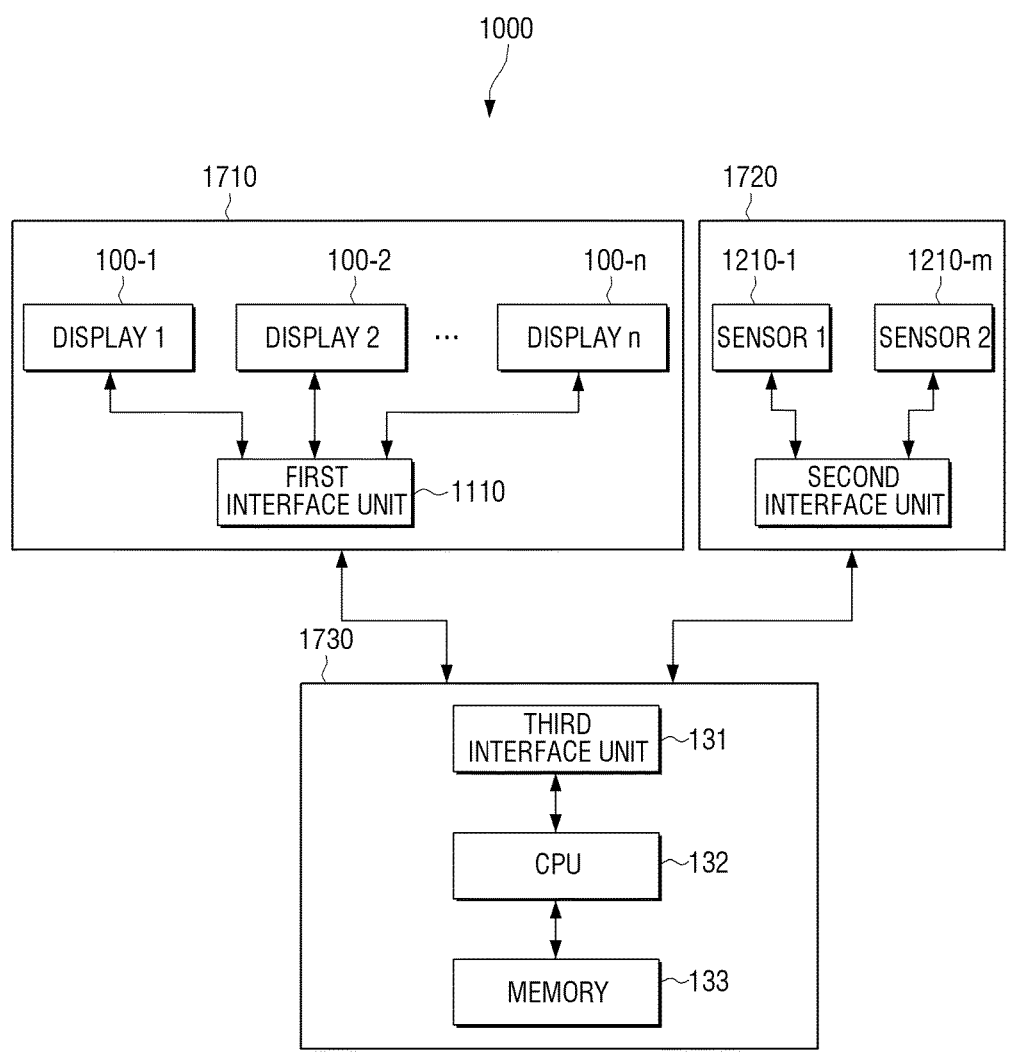
FIG. 17 is a block diagram illustrating another example of the internal configuration of the display system.

FIG. 17 is a block diagram illustrating another example of the internal configuration of the display system.

Referring to FIG. 17, the display system 1000 may be configured by combining a plurality of independent devices. In detail, the plurality of independent devices may include a video wall 1710, a sensing device 1720, and a host device 1730 of the display system 1000. In a functional aspect, the video wall 1710 may correspond to the display unit 110, the sensing device 1720 may correspond to the sensing unit 120, and the host device 1730 may correspond to the control unit 130 in FIG. 2.

The video wall 1710 includes the plurality of displays 100-1 to 100-*n* which are coupled to each other and a first interface unit 1110 that performs communication between each of the displays 100-1 to 100-*n* and the host device 1730. The respective displays 100-1 to 100-*n* may be connected to each other by any of various connection tools. In FIG. 17, one first interface 1110 is provided, but a respective interface may be provided for each of the displays 100-1 to 100-*n*.

The sensing device 1720 includes the plurality of sensors 1210-1 to 1210-*m* installed at the bezel, such as the connectors or corners among the displays 100-1 to 100-*n*, and a second interface unit 1220 that performs communication between the plurality of sensors 1210-1 to 1210-*m* and the host device 1730.

The host device 1730 is a device that is configured for controlling an operation of the video wall 1710 based on the sensing result obtained by the sensing unit 1720. The host device 1730 may be implemented in any of various forms including a personal computer (PC), a laptop computer, a cellular phone, a personal digital assistant (PDA), a tablet PC, and the like, but is not particularly limited thereto.

The host device 1730 includes a third interface unit 131, a central processing unit (CPU) 132, and a memory 133. The third interface unit 131 may perform communication with each of the first and second interface units 1110 and 1220 in a wired or wireless communication scheme.

The CPU 132 performs the aforementioned various processing operations by executing a program stored in the memory 133. In detail, the CPU 132 generates the light intensity map by interpolating sensor values sensed by the sensing device 1720, and determines the ROI based on the light intensity map. When the ROI is determined, the CPU 132 may perform luminance adjustment processing and/or the operation of modifying the contents layout and/or scale with respect to the ROI.

In FIG. 17, the CPU 132 and the memory 133 are illustrated as separate components, but may be implemented by one SoC or by other different types of components.

Figure 18:
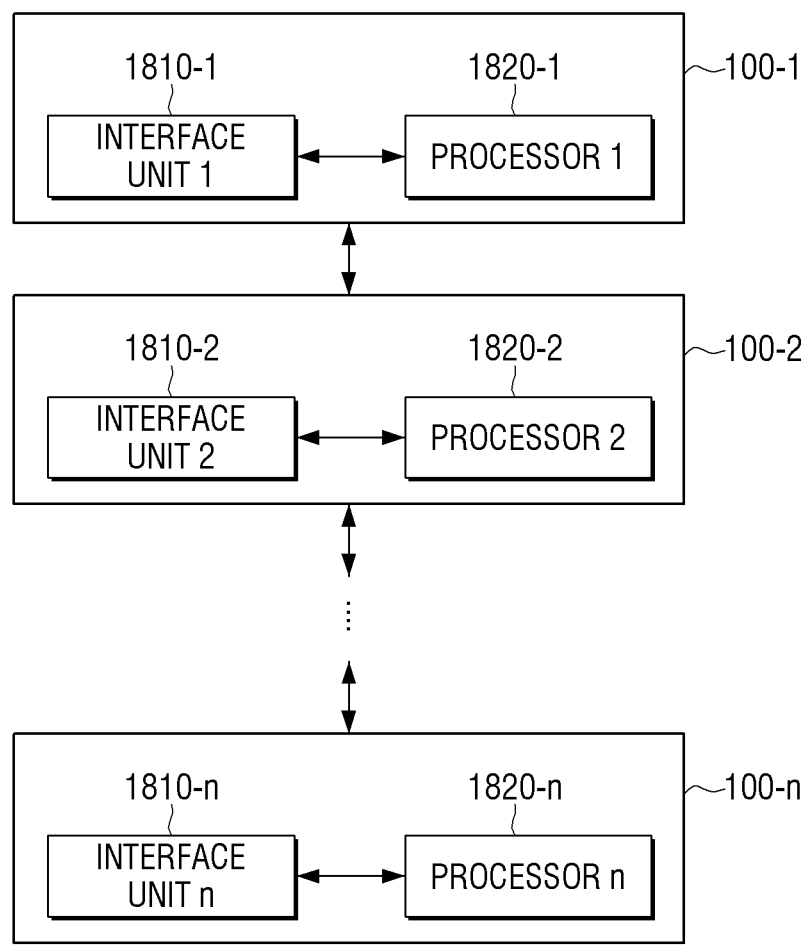
FIG. 18 is a block diagram illustrating yet another example of the internal configuration of the display system.

FIG. 18 is a block diagram illustrating yet another example of the internal configuration of the display system. Referring to FIG. 18, the display system 1000 includes the plurality of displays 100-1~100-*n*.

In FIG. 18, each of the displays 100-1 to 100-*n* includes respective interface units 1810-1 to 1810-*n* and respective processors 1820-1 to 1820-*n*.

The interface units 1810-1 to 1810-*n* are components which are configured for performing communication among the displays 100-1 to 100-*n* and/or with an external device.

The processors 1820-1 to 1820-*n* are components which are configured for processing images to be displayed in the displays 100-1 to 100-*n*.

An operation of the display system 1000 which is configured as illustrated in FIG. 18 may be variably implemented according to various examples.

As one example, each of the displays 100-1 to 100-*n* may autonomously process the contents data and thereafter, perform any of the operations which include the luminance adjustment, the modification of the contents layout, the modification of the scale, or the like described above. In detail, the interface units 1810-1 to 1810-*n* of each of the displays 100-1 to 100-*n* may receive the same contents data from external devices. The respective interface units 1810-1 to 1810-*n* transfer the received contents data to each of the corresponding processors 1820-1 to 1820-*n*. The processors 1820-1 to 1820-*n* decode the received contents data in order to restore all contents images. The processors 1820-1 to 1820-*n* determine a sub image that corresponds to a relevant display based on information that relates to the number of displays, a layout pattern, a layout position, and the like of all of the displays 100-1 to 100-*n*. Further, the processors 1820-1 to 1820-*n* determine whether to process sub images to be processed thereby based on an illuminance of light sensed by the relevant display itself or a neighboring display. For example, when it is determined that the first display 100-1 is a display that is positioned on an uppermost left end among all of the displays 100-1 to 100-*n* and the first display 100-1 exists in the ROI, the processor 1 1820-1 divides all of the contents images based on the number of and the layout pattern of all of the displays 100-1 to 100-*n* and thereafter, adjusts the luminance of an uppermost left image or performs one or more processing functions, such as the modification of the contents layout, the modification of the scale, the deactivation of the display, or the like. As such, the operation of each of the displays 100-1 to 100-*n* may be performed by the embedded processors 1820-1 to 1820-*n*.

As another example, one of the respective displays 100-1 to 100-*n* may operate as a master device and the residual displays may operate as slave devices. In detail, when the first display 100-1 is the master device, the processor 1 1820-1 may serve as a central processor. The processor 1 1820-1 may restore the entire contents screen by decoding the contents data and thereafter, adjust the luminance of a content area that corresponds to the ROI in the entire contents screen, and/or perform processing of modifying the layout and/or scale of the entire contents screen. The processor 1 1820-1 divides the processed contents screen based on the number and the layout pattern of all of the displays 100-1 to 100-*n* and thereafter, transmits the divided contents screen to other displays 100-2 to 100-*n* via the interface unit 1 1810-1. The respective processors 1820-2 to 1820-*n* of other displays 100-2 to 100-*n* adjust various options based on unique characteristics of the relevant displays 100-2 to 100-*n* and thereafter, display the options via a display panel (not illustrated).

As described above, according to various exemplary embodiments, the form and the configuration of the display system may be variously modified.

Further, the display system may perform various operations in some exemplary embodiments.

FIG. 19 is a diagram for describing an operation of the display system, according to yet another exemplary embodiment. In FIG. 19, the sensing unit 120 includes the light quantity sensing layer 125 embedded in the display 100, similarly as in the exemplary embodiment illustrated in FIG. 12.

When the light that propagates through the display panel 111 is incident in the light quantity sensing layer 125, the light quantity sensing layer 125 determines a color of the light by using the plurality of distributed sensors 125-1. As the sensors 125-1, any of the CCD, the CMOS, the RGB sensor, and the like may be used.

When a color component of the light is determined by the sensing unit 120, the control unit 130 compensates a color of an image area 1910 that corresponds to the light incident area 10 in an image 1900 to be displayed by the display panel 111. In detail, the control unit 130 compensates the color so that an external viewer recognizes the color of the image area 1910 that corresponds to the light incident area 10 as an original color, in order to enable the viewer to view colors of residual image areas 1920 without a sense of difference. For example, when many R values exist in the color component of the light, an R value of the image area 1910 to be displayed is decreased in order to cause the viewer to perceive the decreased R value, similarly as with respect to the R values of the residual image areas 1920.

Figure 20:
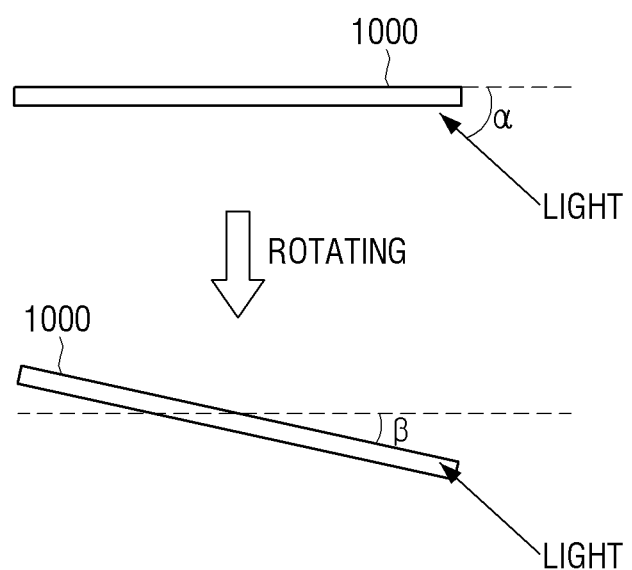
FIG. 20 is a diagram for describing the operation of a display system, according to still another exemplary embodiment.

FIG. 20 is a diagram for describing the operation of a display system, according to still another exemplary embodiment. FIG. 20 illustrates a state of the display system 1000 as viewed from the top. According to the exemplary embodiment of FIG. 20, the display system 1000 includes a hinge (not illustrated) which facilitates an action of manually or automatically changing a display direction.

When the light is incident in one direction and securing the visibility is thus impossible, the control unit 130 changes an orientation of the display system 1000 by controlling the hinge. When the light is incident in a front right direction of the display system as illustrated in FIG. 20, the control unit 130 rotates the display unit 110 in a direction opposite to the incident direction of the light, that is, an arrow direction. A rotational angle $\beta$ may vary based on the incident direction and an incident angle $\alpha$. $\alpha$ and $\beta$ may be set to the same value, but are not particularly limited thereto.

For example, when the light incident area is sensed at a right edge of the display screen, the control unit 130 monitors the position and the size of the light incident area while rotating the display unit 110 to the left. When the control unit 130 determines that the light incident area completely disappears or has a minimum size, the control unit 130 stops the rotation. In this case, the control unit 130 may set a limit angle in order to prevent a display direction from being excessively rotated away from an original direction. For example, the control unit 130 may rotate the display unit 110 at a maximum of $\pm 10°$ or less.

As another example, the control unit 130 variously matches the incident angle α with the rotational angle β and stores the matched pairs of angles in a storage unit (not illustrated) of the display system 1000. The control unit 130 may rotate the display unit 110 based on stored angle information.

In FIG. 20, the display unit 110 may be rotated both horizontally and vertically. In this case, when the light is incident upon the top of the display unit 110, the control unit 130 rotates the display unit 110 so that the top of the display unit 110 is tilted forward.

Figure 21:
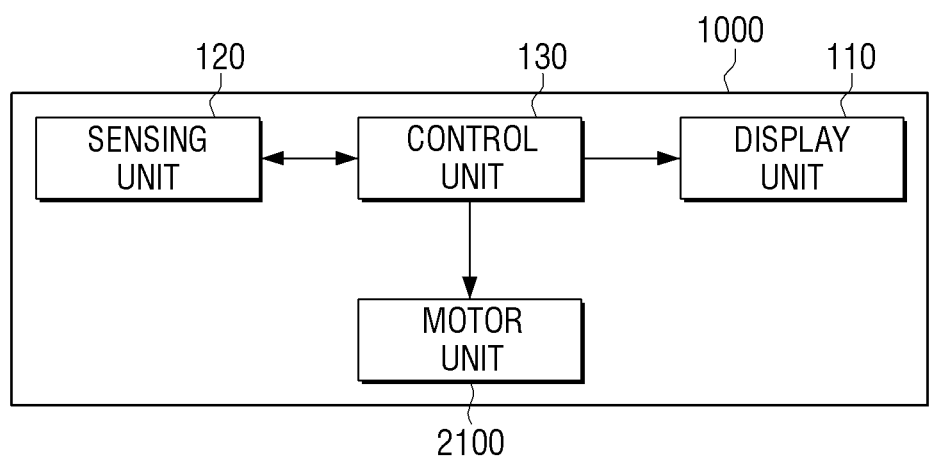
FIG. 21 is a block diagram illustrating a configuration of the display system 1000 for performing the operation illustrated in FIG. 20.

FIG. 21 is a block diagram illustrating a configuration of the display system 1000 for performing the operation of FIG. 20. Referring to FIG. 21, the display system 1000 includes the display unit 110, the sensing unit 120, the control unit 130, and a motor unit (also referred to herein as a "motor") 2100.

Since the configurations and the operations of the display unit 110 and the sensing unit 120 have been described in detail in the aforementioned various exemplary embodiments, duplicated description is omitted.

The control unit 130 transmits a driving signal to the motor 2100 based on the sensing result of the sensing unit 120. The motor unit 2100 modifies a form of a hinge installed on a connector that connects the display unit 110 with a support unit (not illustrated) in order to facilitate a rotation of the display unit 110 in at least one direction from among upward, downward, left, and right directions.

Figure 22:
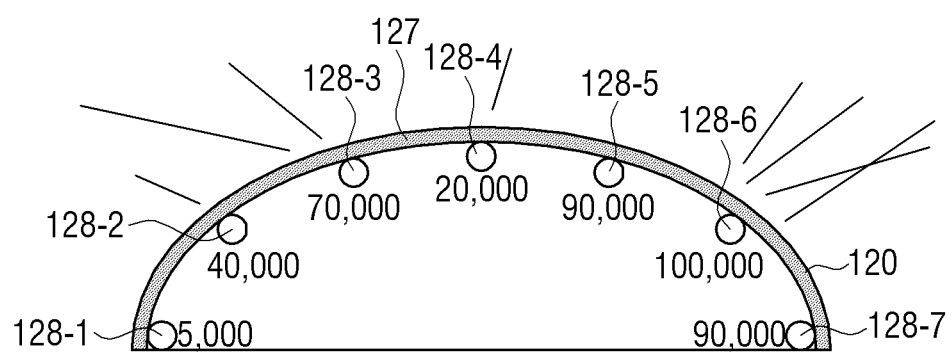
FIG. 22 is a diagram illustrating a configuration example of the sensing unit for sensing an incident direction of light.

FIG. 22 is a diagram illustrating a configuration example of the sensing unit 120 for sensing the direction of incidence of the light. Referring to FIG. 22, the sensing unit 120 includes a curved transparent support unit 127 and a plurality of illuminance sensors 128-1 to 128-7. At least one sensing unit 120 may be installed on the top or on the front surface of the display system 1000.

When the sensing unit 120 is implemented in the form illustrated in FIG. 22, the control unit 130 may accurately and easily determine the direction of incidence or incident angle of the light. As illustrated in FIG. 22, when sensing values obtained by sensors 128-5, 128-6, and 128-7 disposed on the right-hand side of the sensing unit 120 are larger than illuminance values obtained by neighboring sensors, the control unit 130 may determine that the light is incident from the right direction. The control unit 130 may rotate the display unit 110 by considering the direction of incidence or incident angle of the light.

In addition, when the viewer is not positioned directly in front of the display system 1000 but instead positioned in a diagonal direction, the visibility may deteriorate as a result of reflected light. According to yet another exemplary embodiment, the display system 1000 may determine the ROI by considering the position of the viewer and/or an incident angle of the reflected light.

When the display system 1000 includes a motion sensor or a camera, the control unit 130 may accurately sense the position of the viewer. The control unit 130 may determine the position, the size, and the form of the ROI by jointly considering the light incident area and the position of the viewer. For example, when the viewer is positioned to the left of the centerline of a screen of the display system 1000 while the light is incident only upon the right edge, the control unit 130 may extend the ROI up to the center of the screen.

When the display system 1000 does not include the motion sensor or the camera, the control unit 130 may set a target area in front of the display system 1000. The target area refers to an area at which the viewer using the display system 1000 is primarily positioned. The control unit 130 may determine the position, the size, and the form of the ROI by assuming that the viewer is positioned in the target area and jointly considering the light incident direction and the light incident angle of the light and the position of the target area.

Further, the control unit 130 may determine the position, the size, and the form of the ROI by considering an area in which viewing is interrupted due to the reflected light, in addition to the area in which the light is directly incident. In detail, in the case in which the control unit 130 sets the target area, when it is sensed that the light is incident upon the display unit 110, the control unit 130 determines the direction of incidence and the angle of incidence. When the viewer views the display unit 110 in the target area under the verified incidence direction and incidence angle conditions of the light, the control unit 130 may estimate a reflected light area within which the viewer is likely to perceive that the visibility deteriorates. The control unit 130 may determine the ROI so as to include the reflected light area in addition to the area in which the light is directly incident. A range of the target area may be variously set according to the size and a use environment of the display system 1000. Further, the reflected light area is variously set for each of the incidence direction and incidence angle conditions of the light based on the target area to be stored in the display system 1000 in advance.

According to yet another example, the display system 1000 may accurately measure an actual position of the viewer by using the camera or the motion sensor and thereafter, estimate the reflected light area by considering the incidence direction and incidence angle of the light based on the actual position.

As described above, the display system 1000 may enhance the visibility by using various methods and configurations. The display system 1000 may display contents provided from a source device that is connected via a wired or wireless interface, contents provided from contents stored in an internal storage unit, and broadcasting contents received by the broadcasting station.

Figure 23:
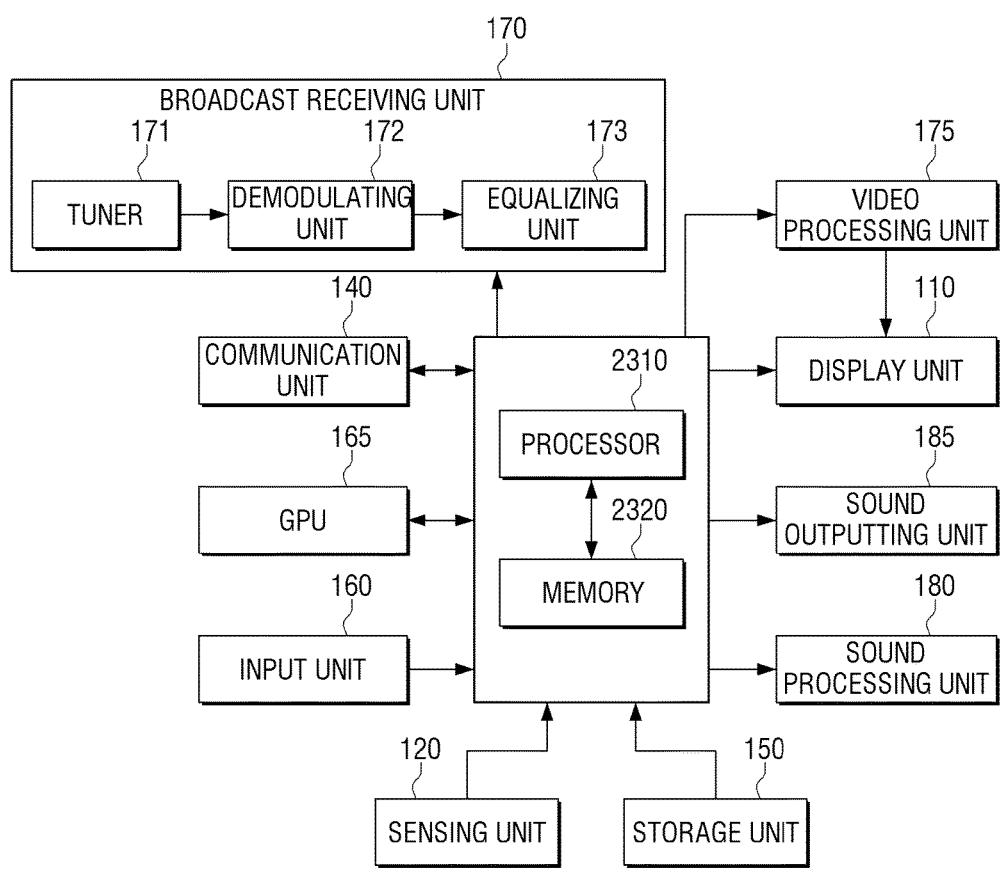
FIG. 23 is a diagram illustrating a case in which the display system 1000 is implemented by a system which can receive and process broadcasting contents.

FIG. 23 is a diagram illustrating a case in which the display system 1000 is implemented by a system which is configured for receiving and processing broadcasting contents. Referring to FIG. 23, the display system 1000 includes the display unit 110, the sensing unit 120, the control unit 130, the communication unit 140, the storage unit 150, the input unit 160, a graphics processing unit (GPU) 165, a broadcast receiving unit (also referred to herein as a "broadcast receiver") 170, a video processing unit (also referred to herein as a "video processor") 175, a sound processing unit (also referred to herein as a "sound processor") 180, and a sound outputting unit (also referred to herein as a "sound outputter" and/or as a "speaker") 185.

The display unit 110 may be implemented by a single display or a plurality of displays as described above. The sensing unit 120 senses light that is incident for each area of the display unit 110. Since the display unit 110 and the sensing unit 120 have already been described in the aforementioned other exemplary embodiments, duplicated description is omitted.

The control unit 130 includes a processor 2310 and a memory 2320. The processor 2310 performs various control operations by executing a program stored in the memory 2320. The memory 2320 may store any of various software modules, including a detection module for detecting various characteristics of light such as the illuminance, a light intensity, the color, and the like based on the sensing value sensed by the sensing unit 120, a map generating module for generating the light intensity map based on the detected characteristics of the light, an ROI determining module for determining the ROI, an image processing module for locally adjusting the luminance according to the ROI, a layout adjusting module for adjusting the layout of the contents screen, a scaling module for modifying the scale of the contents screen, and the like. The software module may be embedded in the memory 2320, but is copied to the memory 2320 while being stored in the storage unit 150 to be provided to the processor 2310. The processor 2310 may perform the control operation described in the aforementioned various exemplary embodiments by executing various software modules stored in the memory 2320.

The communication unit 140 may perform communication with an external server device, and/or a host device or other source devices. The communication unit 140 may perform communication by using any of various communication schemes according to the type or the use environment of the display system 1000. In detail, the display system 1000 performs communication by using any of a wired LAN, WiFi, WiFi-Direct, Bluetooth, Zigbee, a near field communication (NFC) scheme, and the like in addition to the wired interface such as a universal serial bus (USB).

The storage unit 150 may store any of various programs and data used for an operation of the display system 1000. For example, the storage unit 150 may store operating system (0/S) software, middleware, various applications, various data input or sets while executing the application, contents, other setting information, and the like.

The input unit 160 is a component that is configured for receiving various user commands. The input unit 160 may be implemented by any of various means including a keyboard, a mouse, a joystick, a touch screen, a push button, a wheel button, and the like. The control unit 130 performs various control operations according to a user command received via the input unit 160. A user may perform an on-off setting or an option setting for the control operations according to the aforementioned various exemplary embodiments by using the input unit 160. For example, when the user inputs a setting command, the control unit 130 may display a user interface (UI) screen to facilitate an on-off selection with respect to a luminance adjustment option, a layout modification option, a scale modification option, and the like on the display unit 110 or a separately provided touch screen (not illustrated). When the user selects the luminance adjustment option, the control unit 130 may display a UI screen for receiving an illuminance value of the light, which becomes a criterion for the adjusting the luminance, that is, a threshold on the display unit 110 or the touch screen. The control unit 130 may store various input values set via the UI screen in the memory 2320 or the storage unit 150.

The graphic processing unit (GPU) 165 is a component that is configured for generating various graphics screens and displaying the generated graphic screens on the display unit 110. In FIG. 23, the GPU 165 is illustrated like a component separately provided from the control unit 130, but the GPU 165 may be embedded in the control unit 130. The GPU 165 may perform an operation of separating some of objects and changing the separated objects to another position, as described above with respect to the exemplary embodiment illustrated in FIG. 8. Alternatively, the GPU 165 may perform an operation of modifying the layout or scale of the contents as described above with respect to the exemplary embodiment illustrated in FIG. 6 or 7.

The broadcast receiving unit 170 is a component that performs reception processing of the broadcasting contents.

As illustrated in FIG. 6 or 7, the broadcast receiving unit 170 may be implemented by a form including a tuner 171, a demodulating unit (also referred to herein as a "demodulator") 172, and an equalizing unit (also referred to herein as an "equalizer") 173.

The tuner 171 selects a specific broadcasting channel according to a channel selection command from the processor 2310 in order to receive a digital broadcasting signal.

The demodulating unit 172 performs demodulation processing of the broadcasting signal received via the tuner 171. In detail, the demodulating unit 172 performs a processing function of restoring the broadcasting signal received via the tuner 171 to an original signal.

The equalizing unit 173 performs equalization processing of the broadcasting signal demodulated by the demodulating unit 172. In detail, the equalizing unit 173 performs a processing function (equalization of a frequency domain) of weakening distortion of an amplitude or a phase by using a circuit for compensating attenuation of each frequency and a propagation time delay deviation in a transmission band, or a processing function (equalization of a time domain) of smoothing a response waveform by using a circuit for removing distortion included in a response pulse.

The video processing unit 175 is a component that processes video data. The video processing unit 170 may perform any of various image processing functions, such as decoding, scaling, noise-filtering, frame rate conversion, resolution conversion, and the like with respect to the video data.

The sound processing unit 180 is a component that processes sound data. The sound processing unit 180 may perform any of various processing functions, such as decoding, amplification, or noise-filtering of the sound data.

The sound outputting unit 185 is a component that outputs various notification sounds or voice messages in addition to various audio data that is processed by the sound processing unit 180.

FIG. 23 illustrates one example of a detailed configuration included in the display system 1000, and some of the components illustrated in FIG. 23 may be omitted or modified according to an implementation example of the display system 1000, or other components may be further added. For example, when the display system 1000 is implemented by a portable terminal, the display system 1000 may further include a DMB receiving unit (not illustrated) that receives and processes a digital multimedia broadcasting (DMB) signal.

Alternatively, the aforementioned display system 1000 may be implemented by a beam projector that delivers a beam to an external screen in order to form an image. When the display system 1000 is implemented by the beam projector, the display unit 110 among the various aforementioned components of the display system 1000 may be omitted and instead, a beam delivering unit (not illustrated) may be added. The beam delivering unit may include a beam source, a lens, a reflector, and the like, but detailed illustration and description thereof are omitted. In the display system 1000 implemented by the beam projector, the camera may be used to detect the ROI on the image formed on the external screen. The camera may be used while being embedded in or mounted on the display system 1000. The control unit 130 photographs the image of the external screen by using the camera, which is disposed toward the display system 1000, that is, a front surface of the beam projector and thereafter, partially verifies a luminance value of the photographed image in order to determine the ROI or not.

Alternatively, the display system 1000 implemented by the beam projector may detect the ROI by using an external camera as illustrated in FIG. 13 or FIG. 14. The control unit 130 receives photographed image data of the external camera via the communication interface and analyzes the image data in order to determine the ROI or not. When the ROI exists as a result of the determination, the control unit 130 may increase the luminance by increasing a beam output strength of the beam delivering unit, or adjust a beam output direction or angle so that the image is formed on the screen other than the ROI. Alternatively, the control unit 130 may modify the layout itself of the image.

According to the diverse exemplary embodiments as described above, a phenomenon in which the visibility deteriorates due to the external light can be mitigated by improving the visibility.

The method for enhancing the visibility in the display system according to the aforementioned diverse exemplary embodiments is implemented by the program to be provided to the display system.

As one example, a non-transitory computer readable medium may be provided, which stores a program for performing a step of displaying contents by using a display unit that includes a plurality of displays that are combined with each other to display one single content, a step of sensing light that is irradiated onto the surface of the display unit, and a luminance adjusting step of locally adjusting the luminance of an area in which visibility deteriorates as a result of the irradiated light.

The non-transitory computer readable medium does not include a medium that stores data for a short moment, such as a register, a cache, a memory, or the like, but instead refers to a medium that semipermanently stores data and is readable by an apparatus. In detail, various applications or programs may be provided while being stored in the non-transitory computer readable medium, such as, for example, any of a CD, a DVD, a hard disk, a Blu-ray disk, a USB, a memory card, a ROM, or the like.

According to the diverse exemplary embodiments described above, a phenomenon in which visibility deteriorates due to external light and a color distortion phenomenon can be mitigated by improving visibility.

The foregoing exemplary embodiments and advantages are merely exemplary and are not to be construed as limiting the present inventive concept. The present inventive concept can be readily applied to other types of apparatuses. Further, the description of the exemplary embodiments is intended to be illustrative, and not to limit the scope of the claims, and many alternatives, modifications, and variations will be apparent to those of ordinary skill in the art.

What is claimed is:

1. A display system comprising:
a display device comprising a plurality of displays;
a sensor; and
a processor configured to:
control the display device to display a content,
control the sensor to sense light that is irradiated onto a surface of the display device,
locally adjust a luminance of at least one portion of the display device at which the sensed light causes a deterioration in a visibility of the displayed content,
wherein the processor is configured to adjust the luminance of an entirety of each display among the plurality of displays based on a size ratio of an area of the each display to which the light is irradiated in the each display among the plurality of displays.

2. The display system as claimed in claim 1, wherein:
the processor is further configured to increase the luminance of at least one portion of the plurality of displays to which the sensed light is irradiated.

3. The display system as claimed in claim 2, wherein the sensor includes a plurality of illuminance sensors that are distributed in at least one from among a plurality of connectors and a plurality of bezel areas that are included in the plurality of displays.

4. The display system as claimed in claim 3, wherein the processor is further configured to, in response to identifying that illuminance values of light sensed by the plurality of illuminance sensors are nonuniform, obtain a light intensity map by interpolating the illuminance values and to use the light intensity map for the adjusting the luminance.

5. The display system as claimed in claim 1, wherein the processor is further configured to identify a first area in which an illuminance of the sensed light is greater than a first threshold as an invisible area, to identify a second area in which the illuminance of the sensed light is greater than a second threshold and equal to or less than the first threshold as a visibility deterioration area, and to identify a third area in which the illuminance of the sensed light sensed is less than the second threshold as a normal area in order to perform different respective processing functions with respect to each of the first area, the second area, and the third area.

6. The display system as claimed in claim 5, wherein:
the processor is further configured to, in response to identifying that at least one invisible area exists in the display device, modify at least one from among a layout and a scale of the content so that the content is not displayed in the at least one invisible area.

7. The display system as claimed in claim 5, wherein:
the processor is further configured to, in response to identifying that at least one invisible area exists in the display device, modify a layout of the content so that a primary object from among a plurality of objects included in the content and displayed in the at least one invisible area is moved to an area that is outside of the at least one invisible area to be displayed.

8. The display system as claimed in claim 1, wherein:
the each of the plurality of displays includes a display panel, and
the sensor includes a light quantity sensing layer disposed in a rear direction of the display panel.

9. The display system as claimed in claim 8, wherein the processor is further configured to correct a content color of an area of the display device in which the sensed light is incident in order to offset a color change influence by the incident light.

10. A method for enhancing visibility in a display system, the method comprising:
displaying by using a display device that comprises a plurality of displays;
sensing light that is irradiated onto a surface of the display device; and
locally adjusting a luminance of at least one portion of the display device at which the sensed light causes a deterioration in a visibility of a displayed content,
wherein the adjusting comprises adjusting the luminance of an entirety of each display among the plurality of displays based on a size ratio of an area of the each display to which the light is irradiated in the each display among the plurality of displays.

11. The method as claimed in claim 10, wherein the sensing the light comprises sensing an illuminance of the irradiated light by using a plurality of illuminance sensors that are distributed in at least one from among a plurality of connectors and a plurality of bezel areas that are included in the plurality of displays.

12. The method as claimed in claim 11, wherein the locally adjusting the luminance includes:
obtaining, in response to identifying that values of light sensed by the plurality of illuminance sensors are nonuniform, a light intensity map by interpolating the illuminance values,
identifying the at least one portion of the display device at which the visibility deteriorates by using the light intensity map, and
increasing the luminance of the identified at least one portion of the display device.

13. The method as claimed in claim 11, the method further comprising:
identifying a first area in which the illuminance of the sensed light is greater than a first threshold as an invisible area, identifying a second area in which the illuminance of the sensed light is greater than a second threshold and equal to or less than the first threshold as a visibility deterioration area, and identifying a third area in which the illuminance of the sensed light is less than the second threshold as a normal area.

14. The method as claimed in claim 13, the method further comprising:
modifying, in response to identifying that at least one invisible area exists in the display device, at least one from among a layout and a scale of the content so that the content is not displayed in the at least one invisible area.

15. A display system comprising:
a plurality of display screens;
a first sensor; and
a processor configured to:
control the first sensor to sense light that is incident upon the plurality of display screens,
control the plurality of display screens such that an image is displayed on the plurality of display screens,
identify an adjustment for improving a visibility of the image based on the sensed light, and
perform at least one image processing function so as to implement the identified adjustment to the displayed image,
wherein the processor is configured to adjust a luminance of an entirety of each display screen among the plurality of display screens based on a size ratio of an area of the each display screen to which the light is irradiated in the each display screen among the plurality of display screens.

16. The display system of claim 15, wherein the at least one image processing function includes at least one from among increasing a luminance of at least one pixel, modifying a color of at least one pixel, modifying a layout of the image, and modifying a scale of the image.

17. The display system of claim 15, wherein the processor is further configured to identify a first area of the plurality of display screens in which an illuminance of the sensed light is greater than a first threshold as an invisible area, to identify a second area of the plurality of display screens in which the illuminance of the sensed light is greater than a second threshold and equal to or less than the first threshold as a visibility deterioration area, and to identify a third area of the plurality of display screens in which the illuminance of the sensed light sensed is less than the second threshold as a normal area in order to perform different respective image processing functions with respect to each of the first area, the second area, and the third area.

18. The display system of claim 15, further comprising a second sensor configured to sense a position of a viewer with respect to the plurality of display screens,
wherein the processor is further configured to identify the adjustment for improving a visibility of the image based on both the sensed light and the sensed position of the viewer.

* * * * *